Dec. 23, 1958   G. G. ENSIGN ET AL   2,865,163
ELECTRICALLY-POWERED TIME DEVICE
Filed April 15, 1952   19 Sheets-Sheet 1
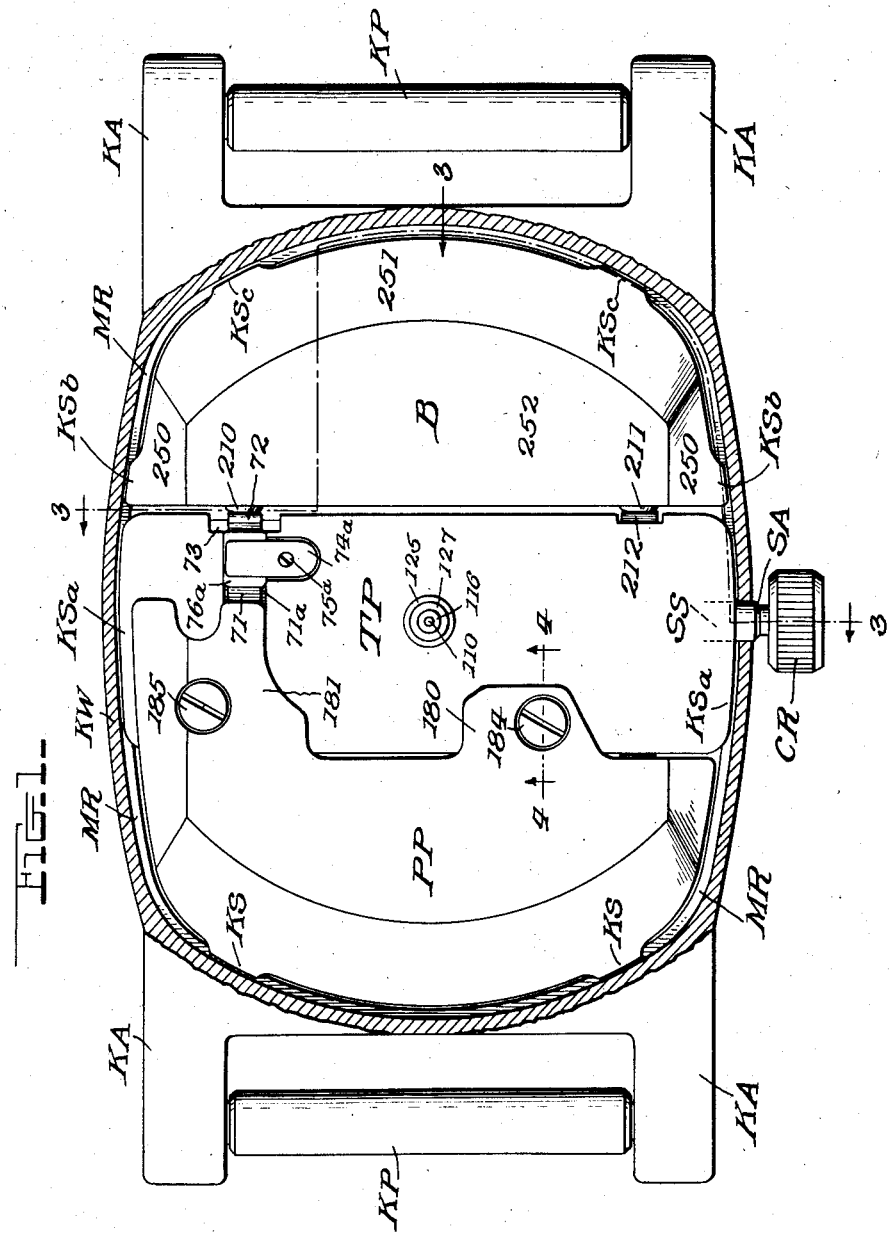
INVENTORS
G. G. Ensign,
G. T. Soper and
O. Lundahl
BY
ATTORNEYS

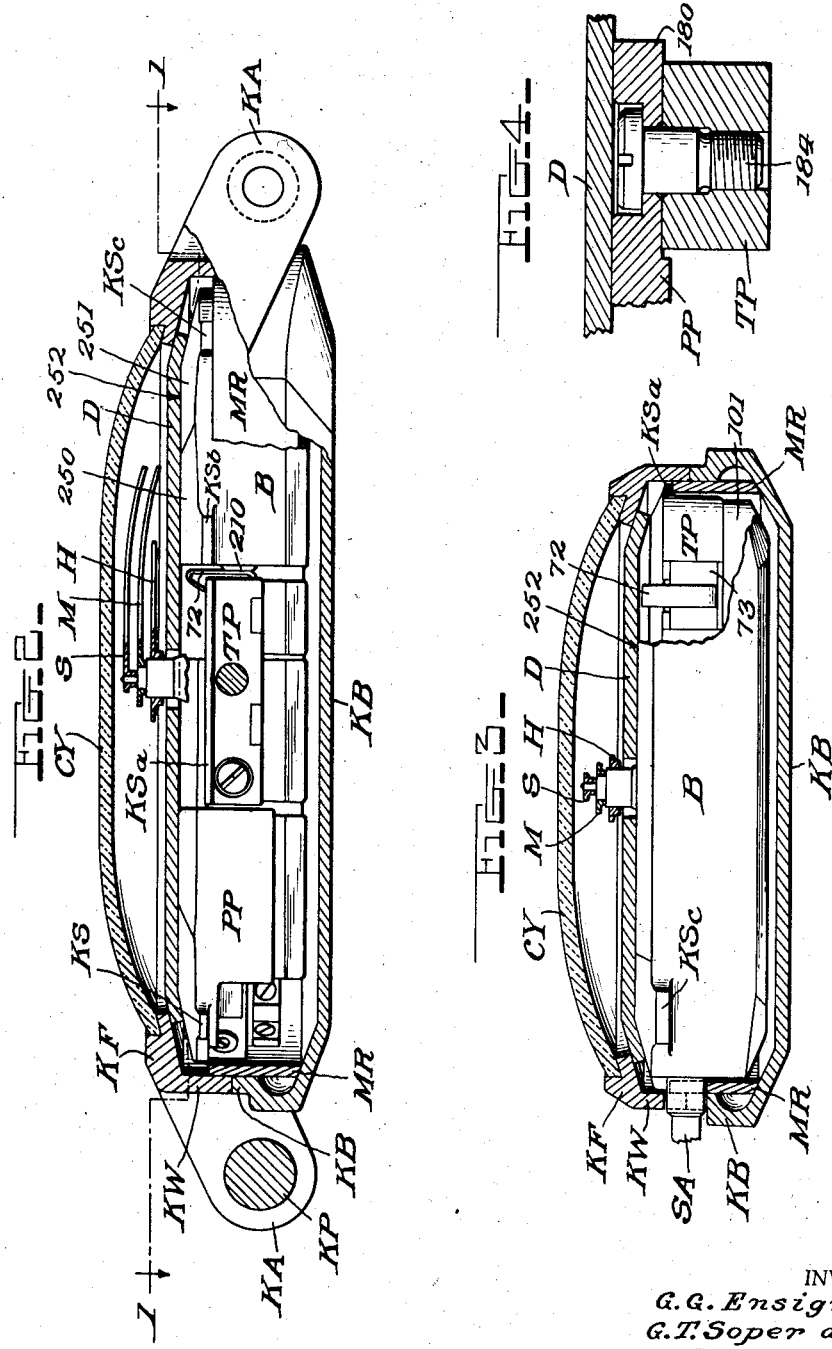

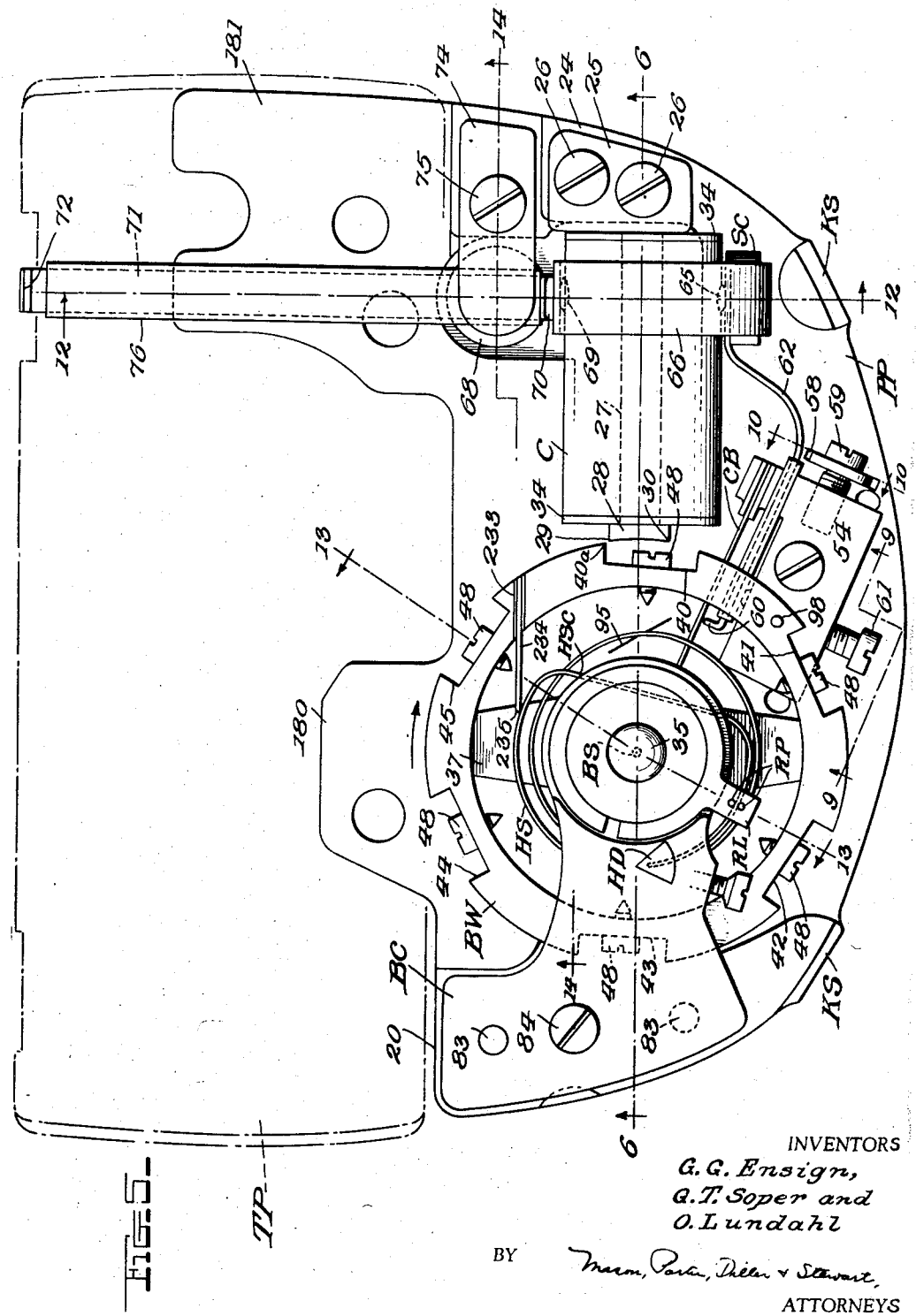

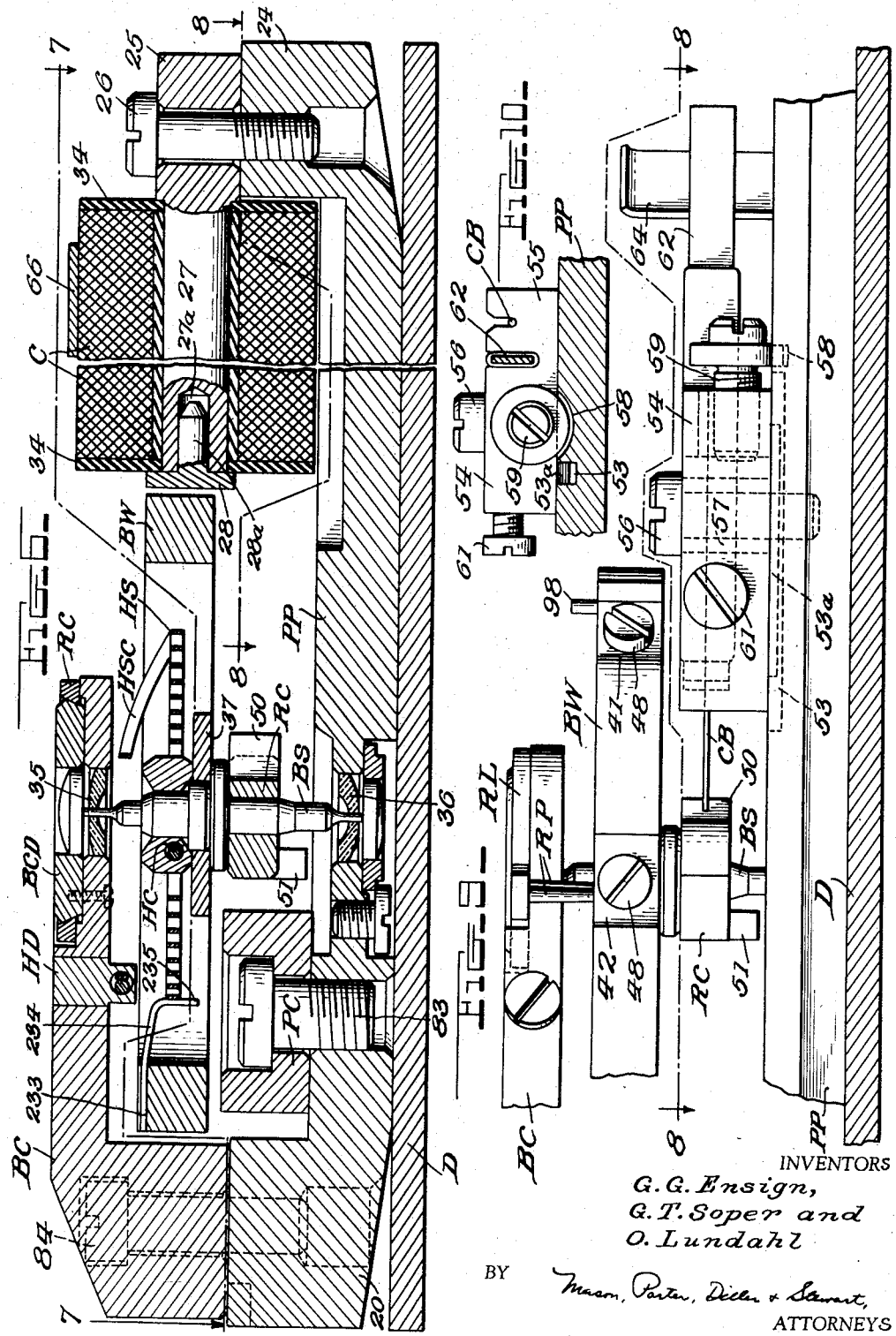

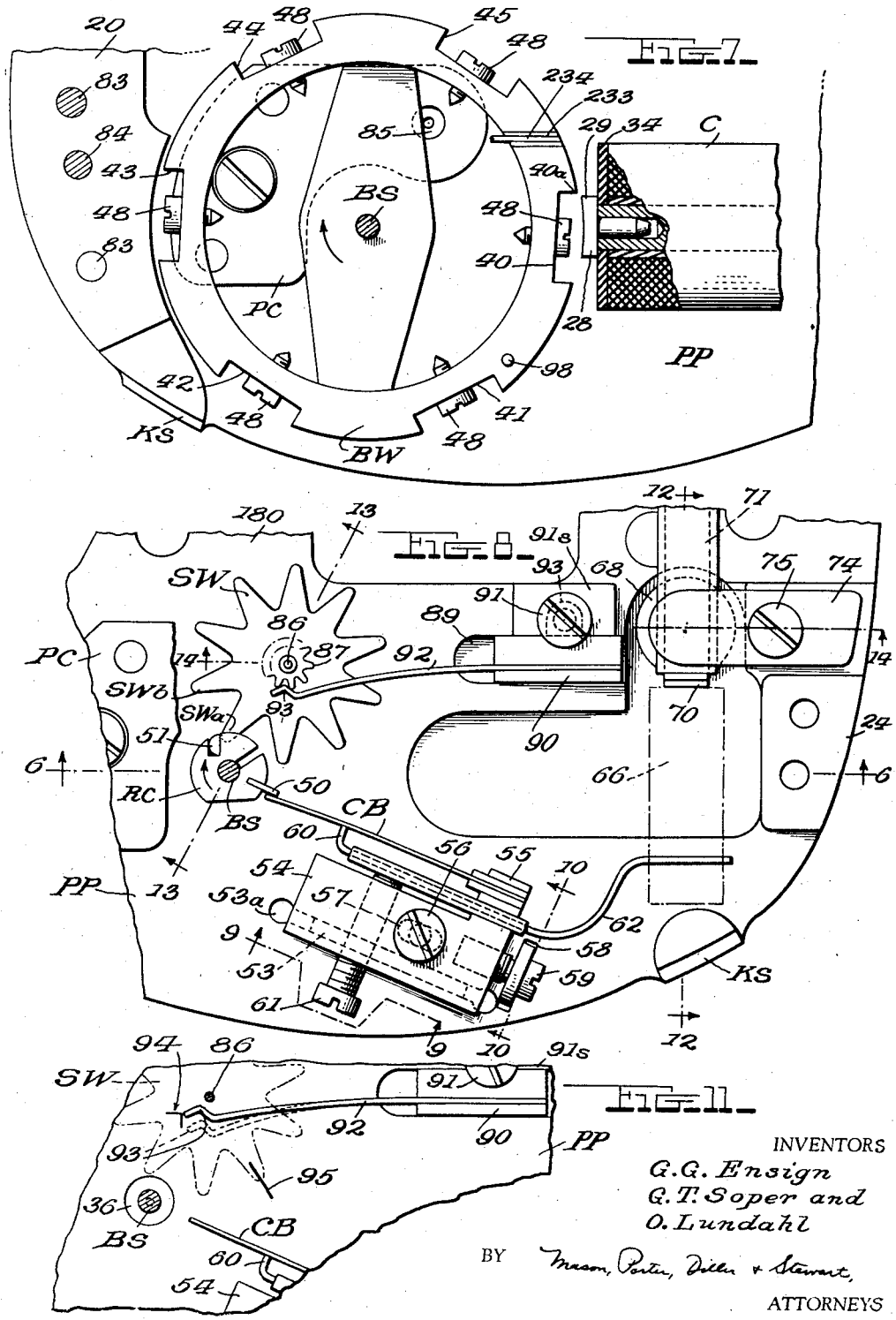

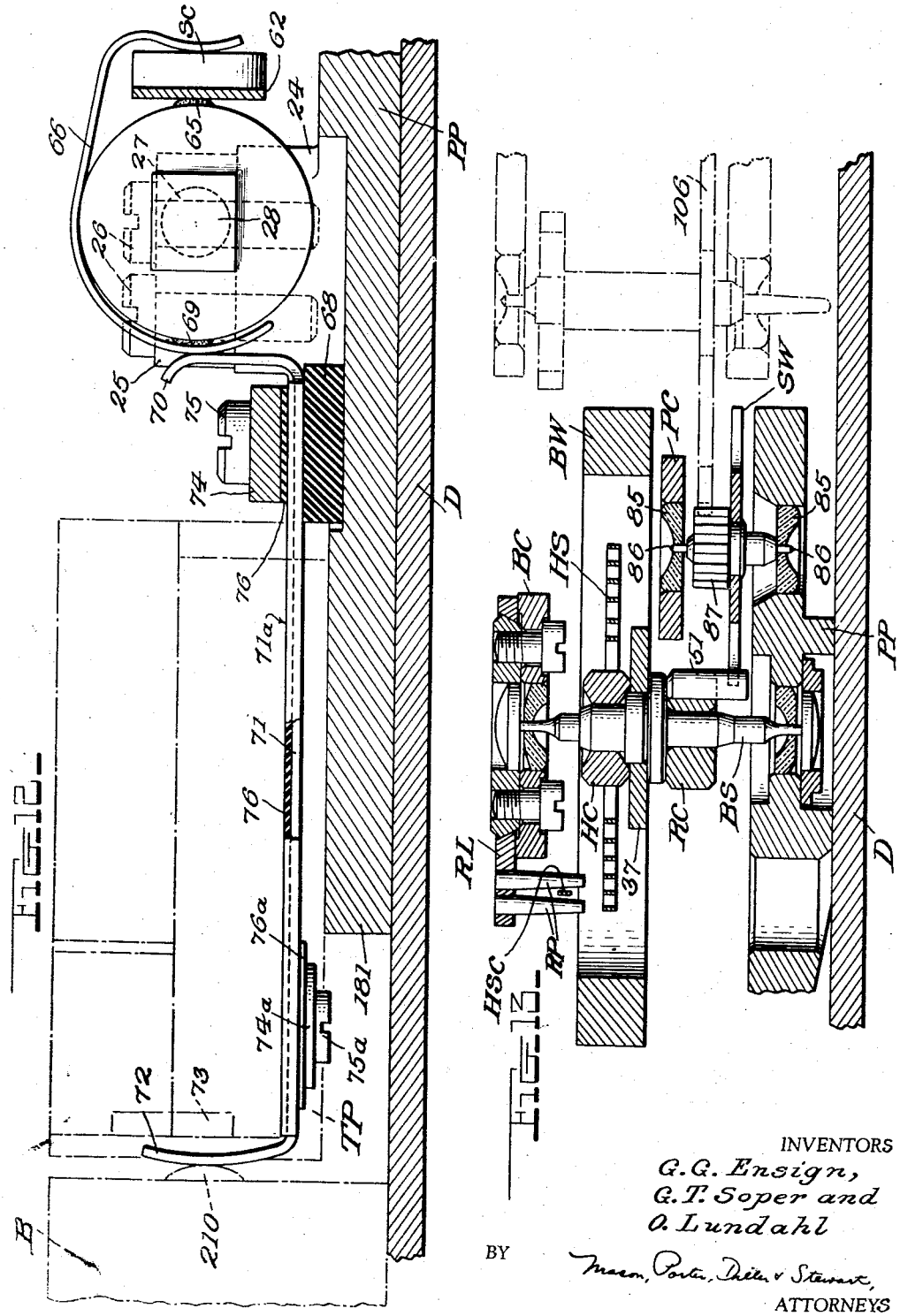

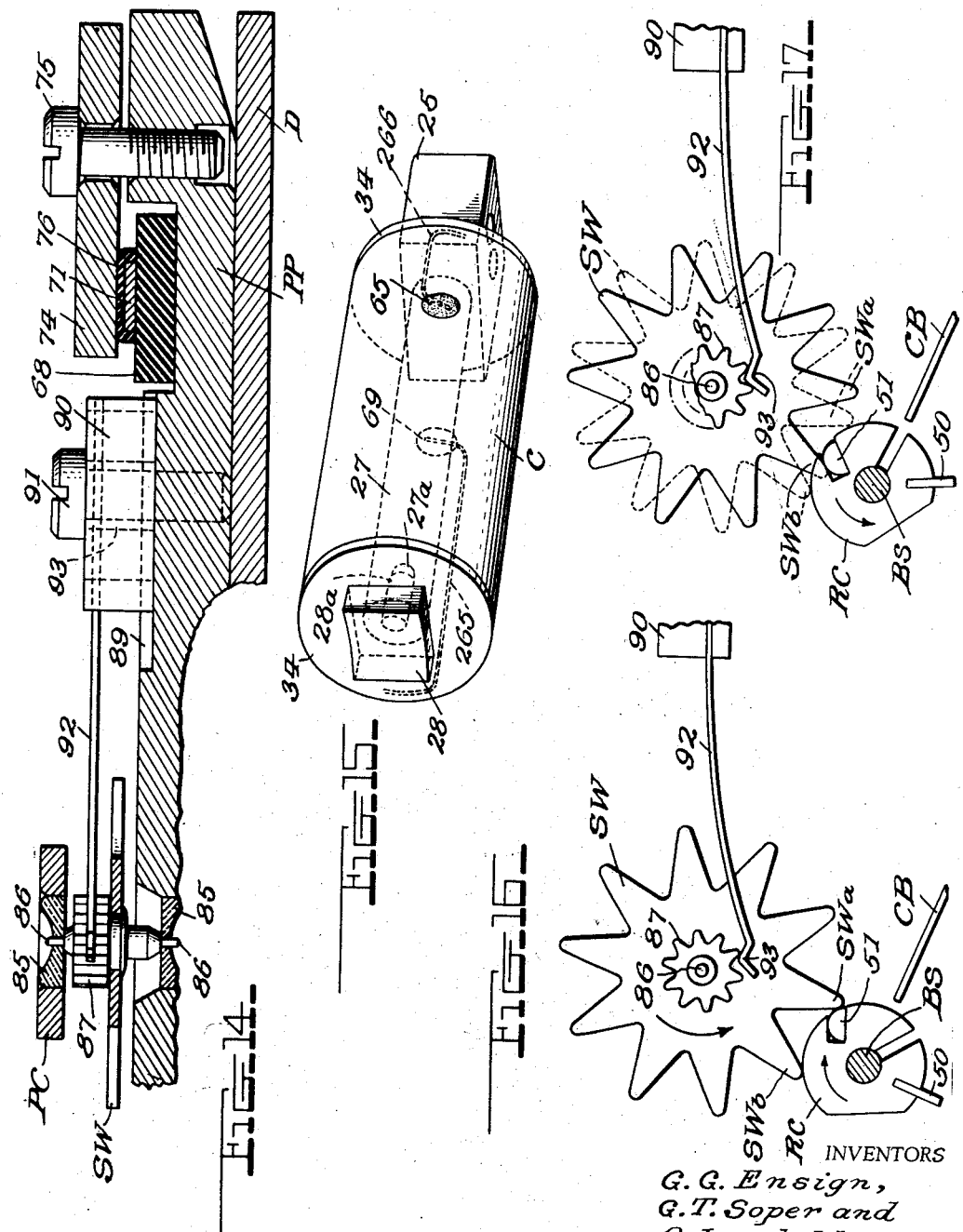

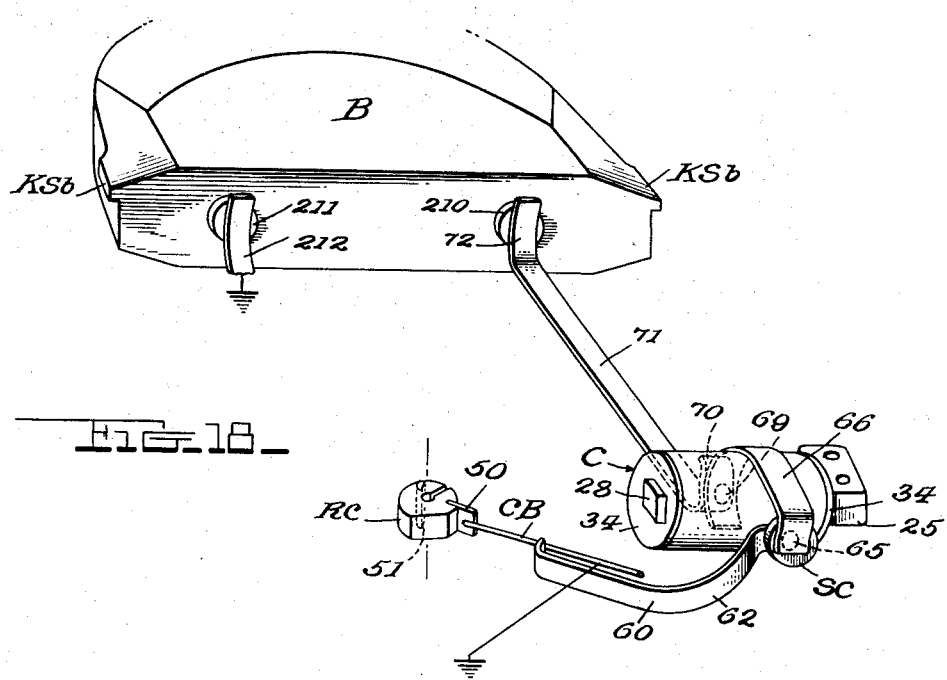
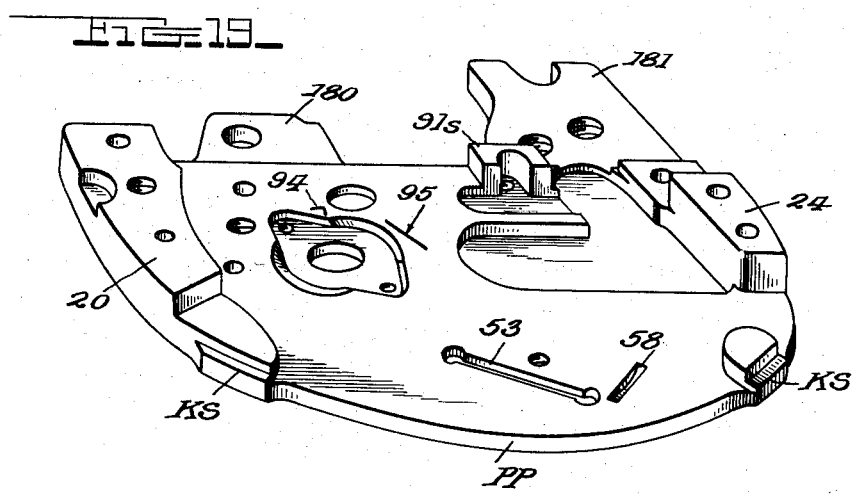

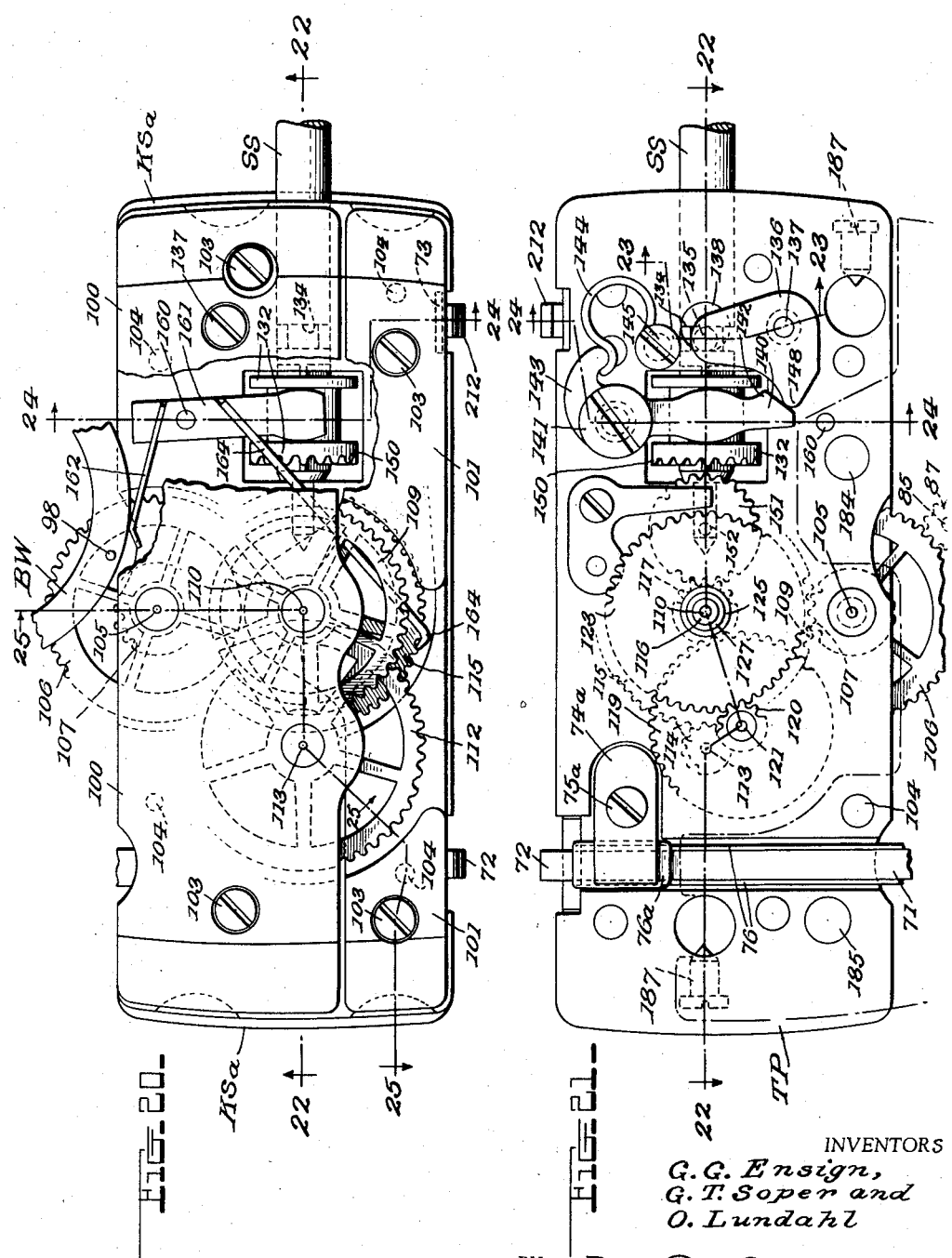

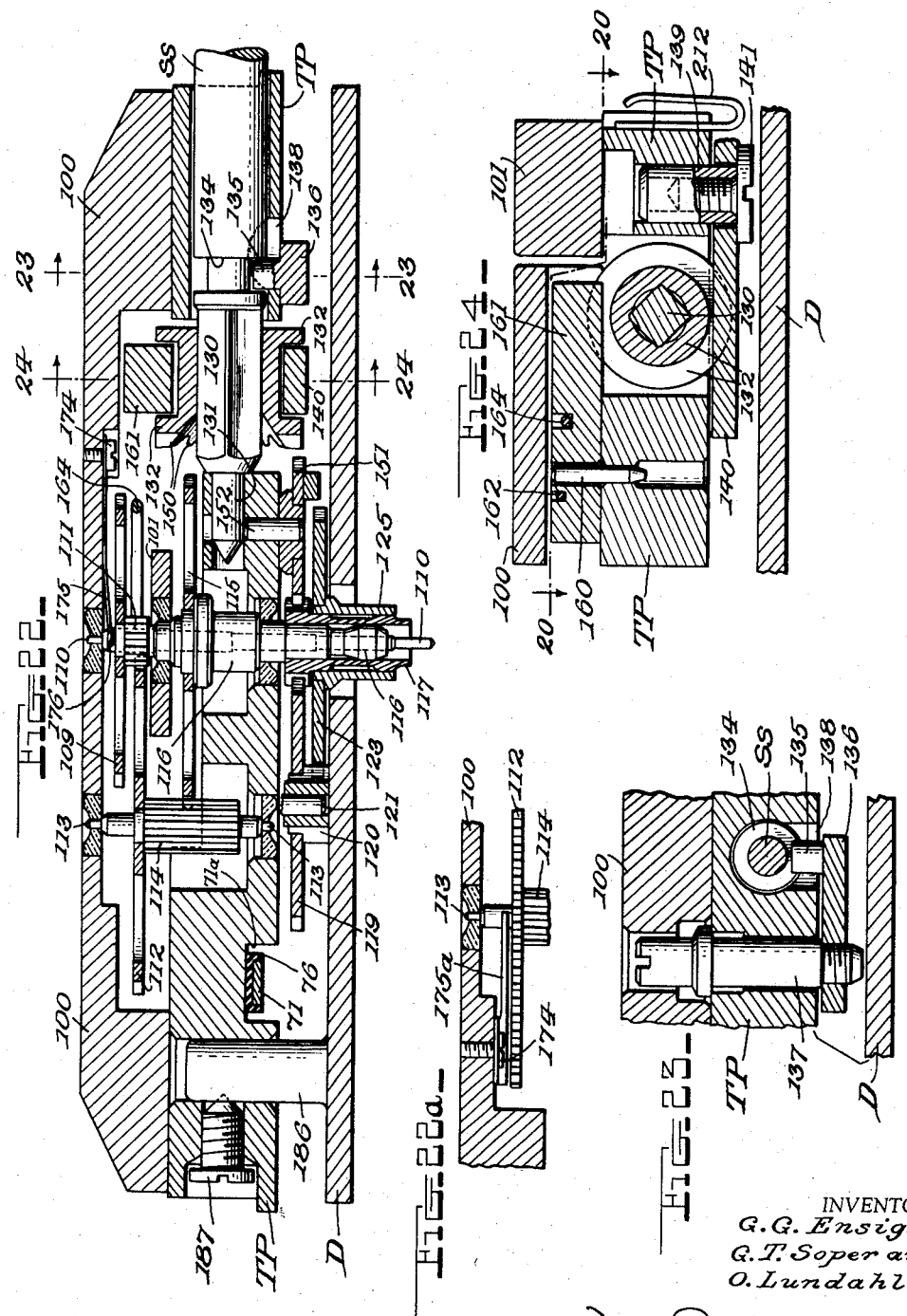

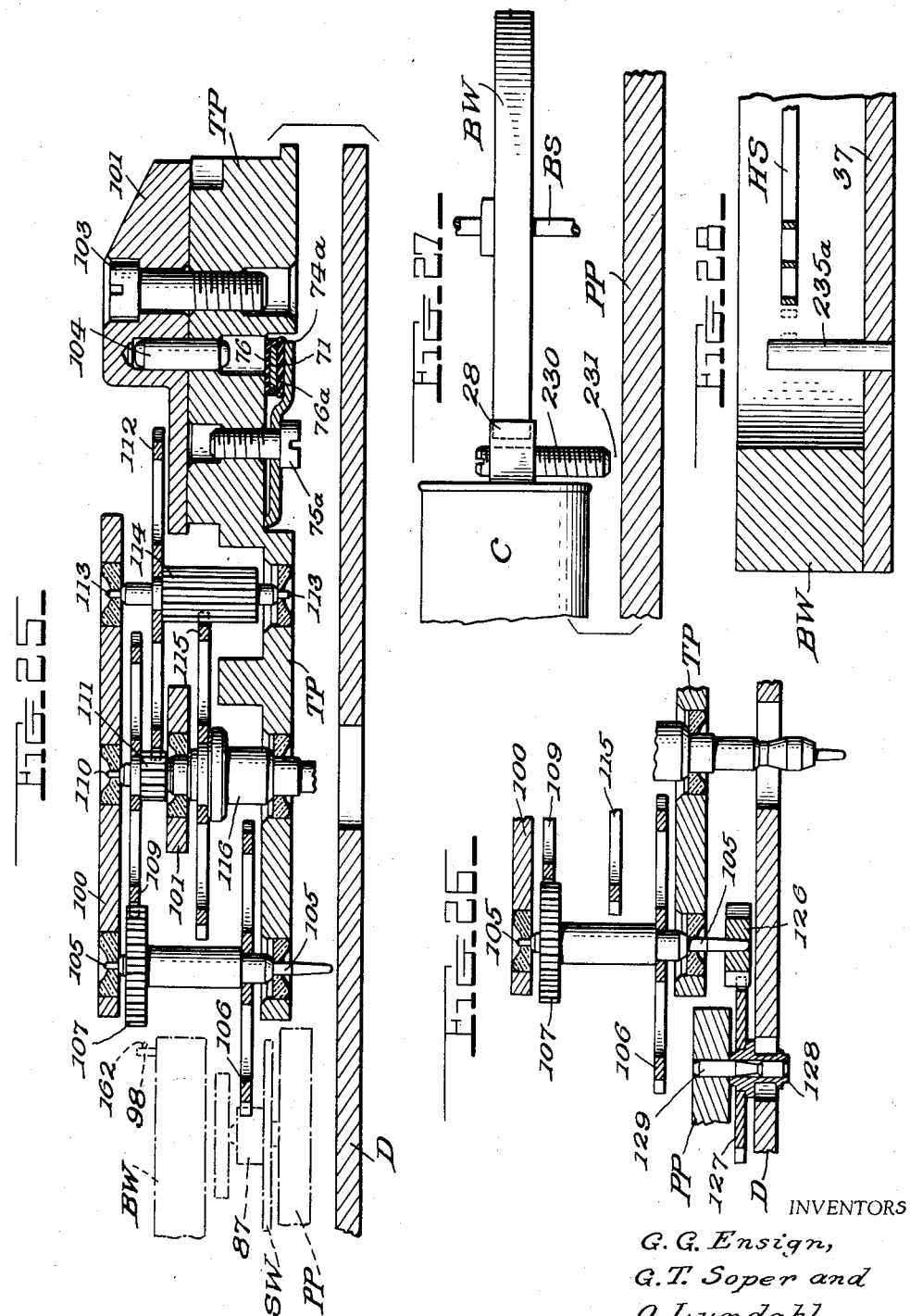

Dec. 23, 1958  G. G. ENSIGN ET AL  2,865,163
ELECTRICALLY-POWERED TIME DEVICE
Filed April 15, 1952  19 Sheets-Sheet 12
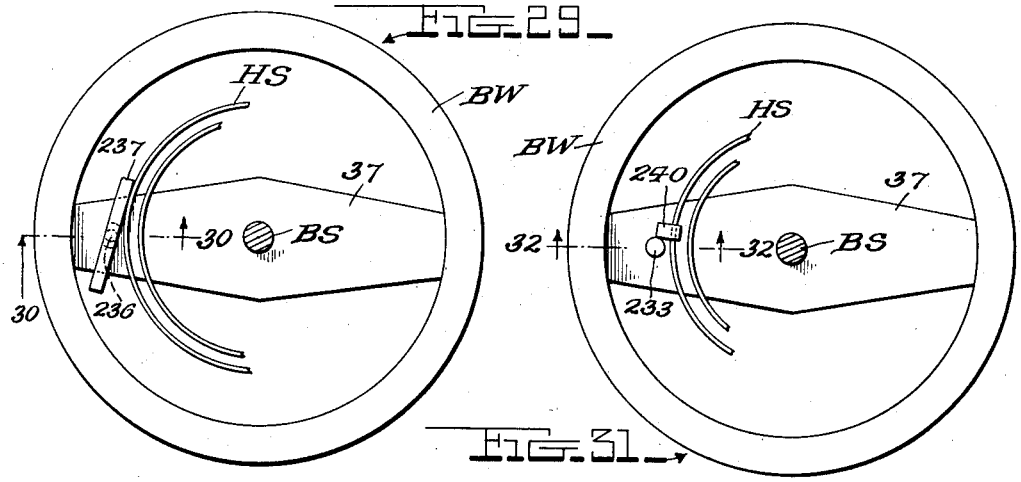
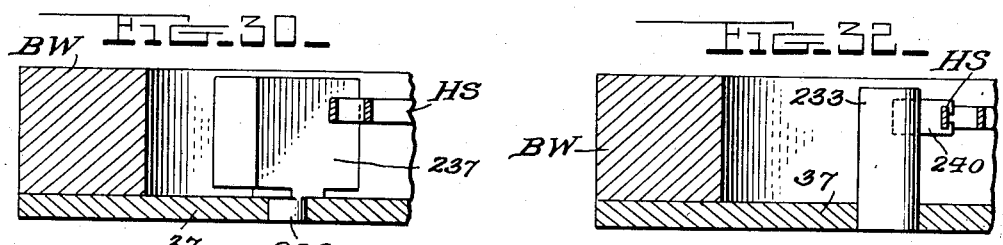
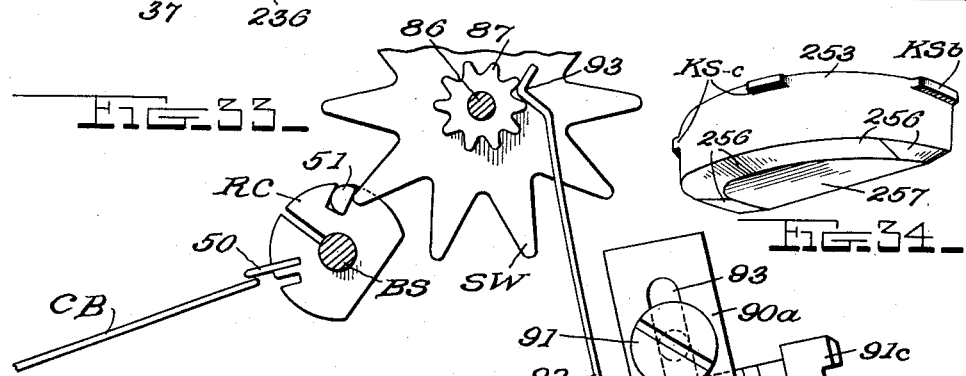
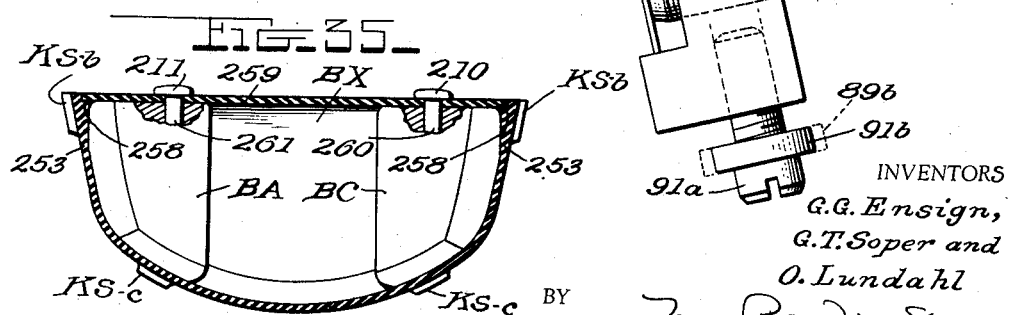
INVENTORS
G. G. Ensign,
G. T. Soper and
O. Lundahl
BY
ATTORNEYS

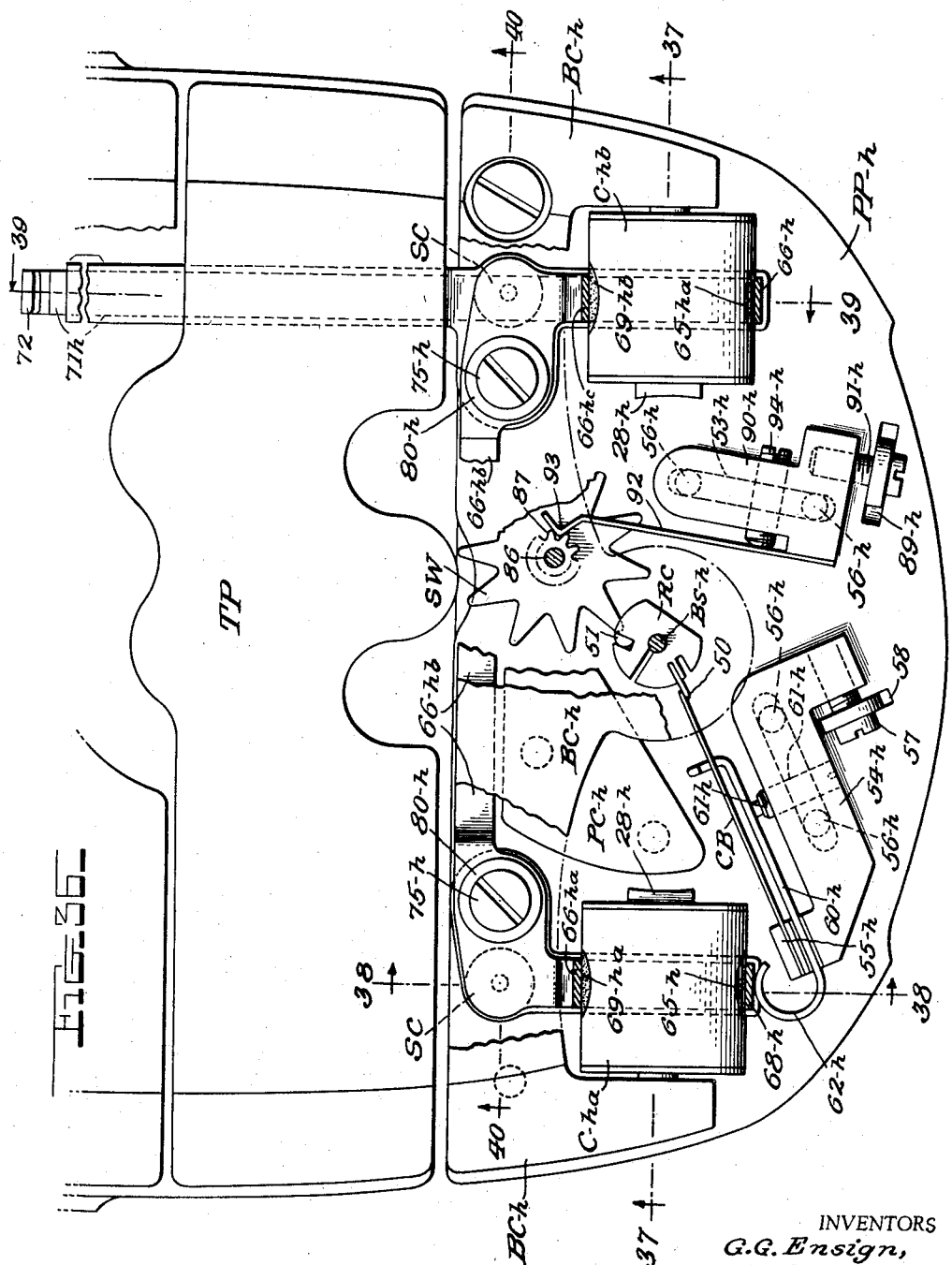

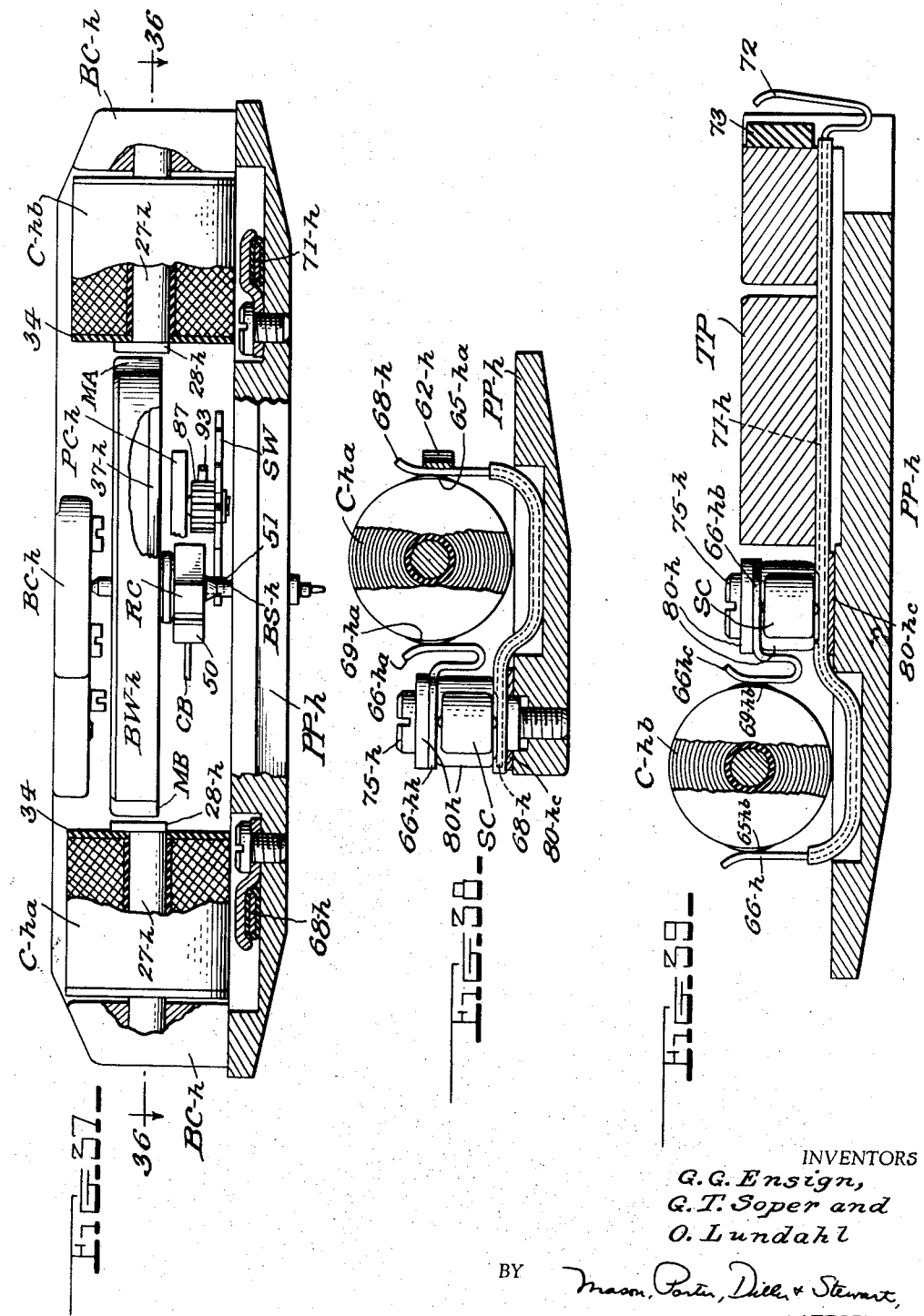

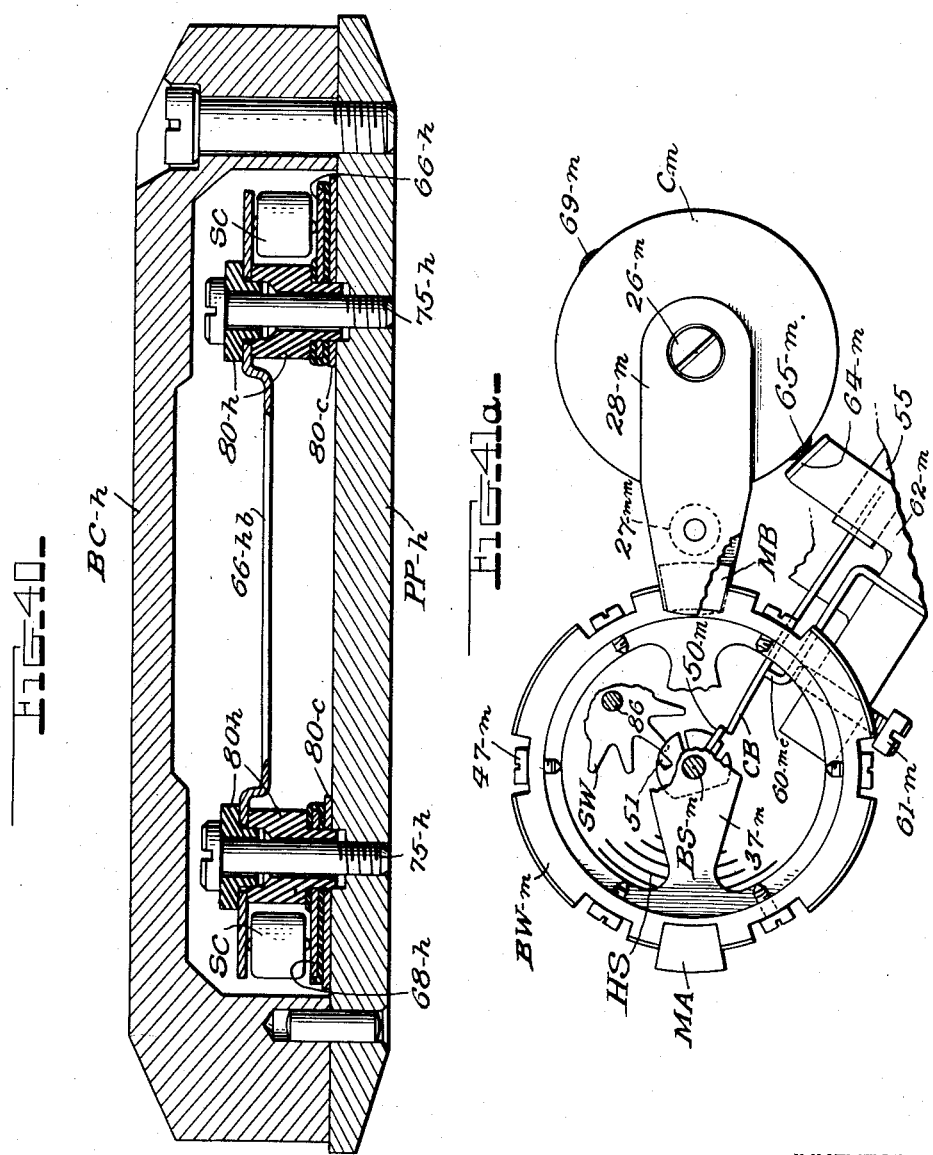

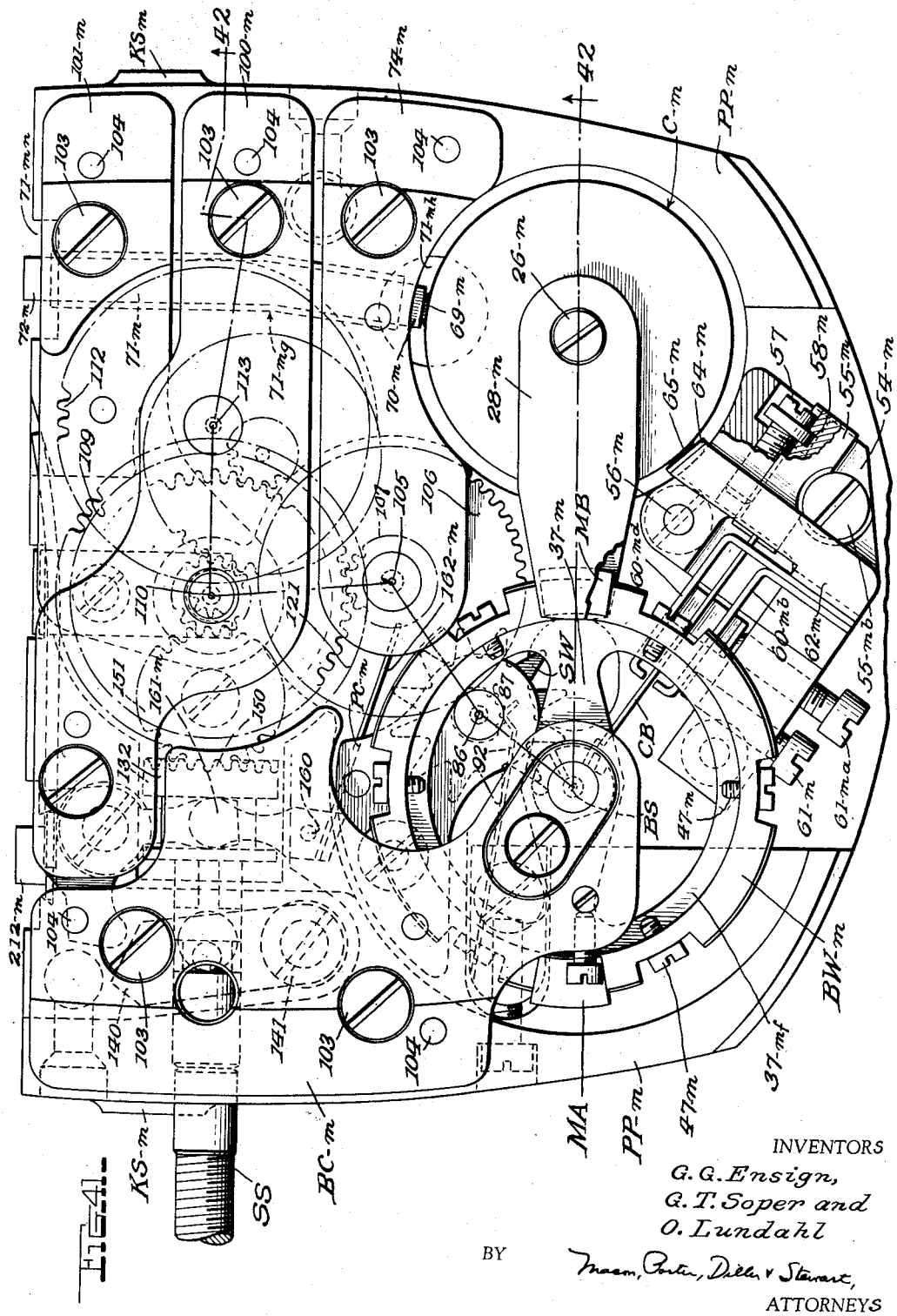

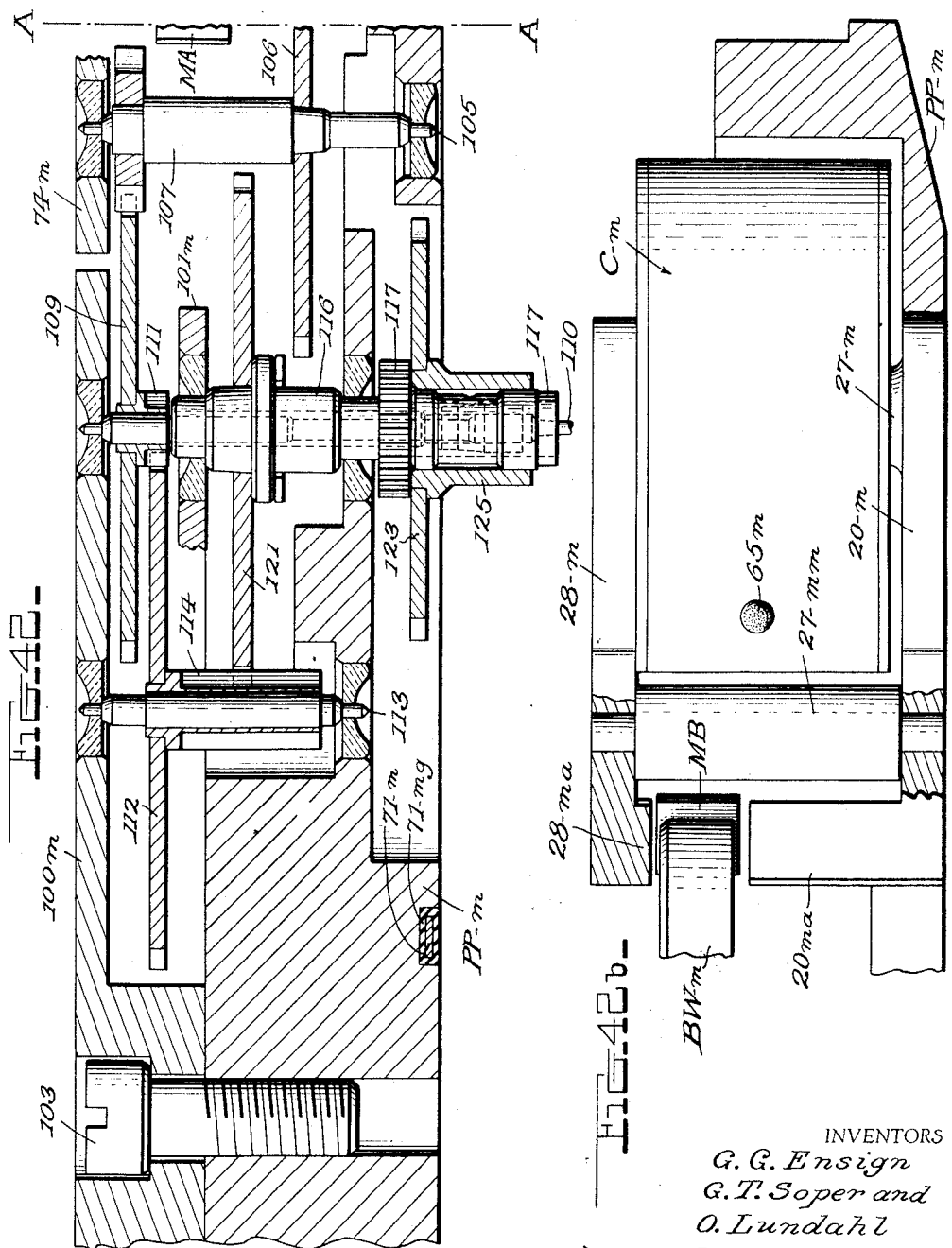

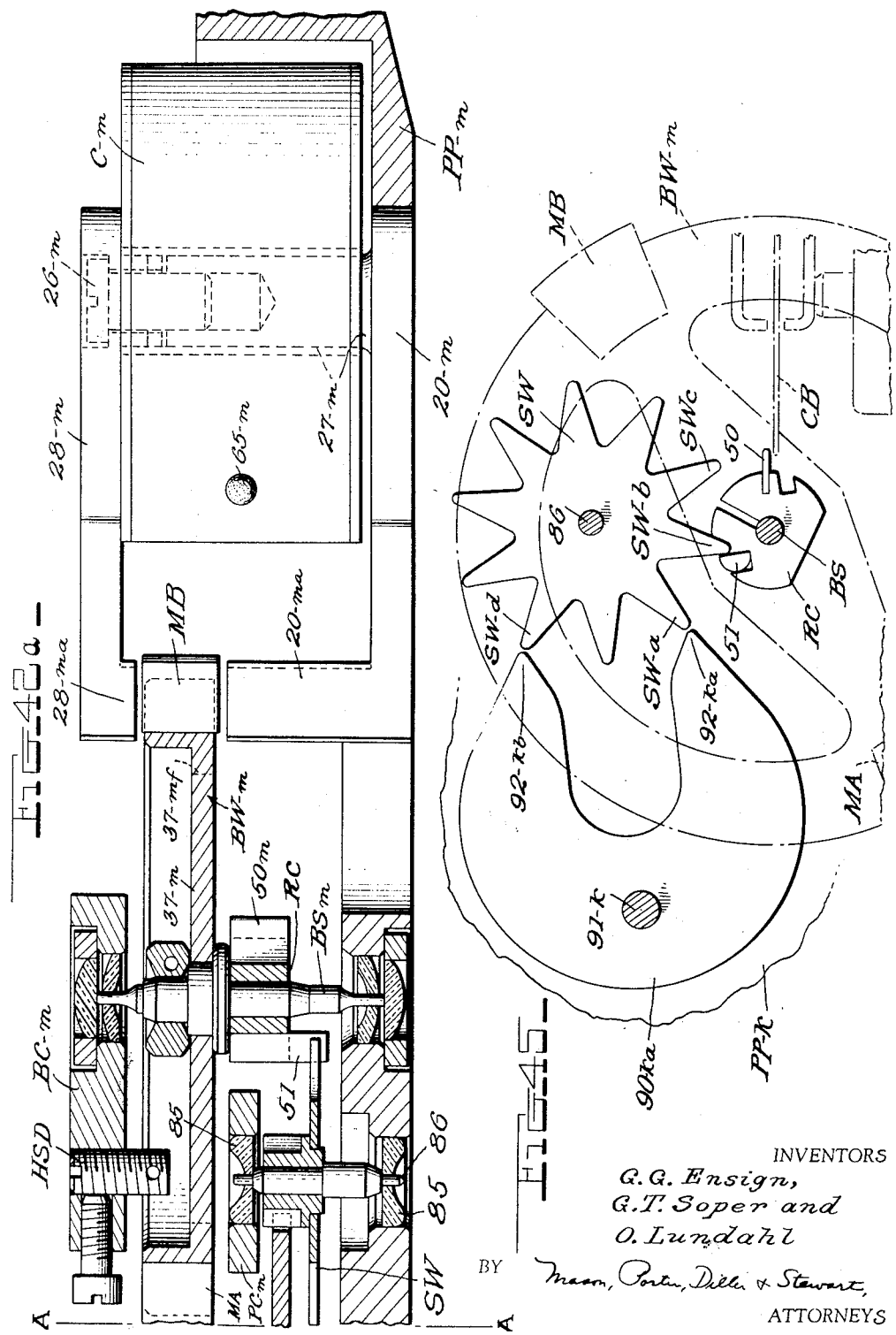

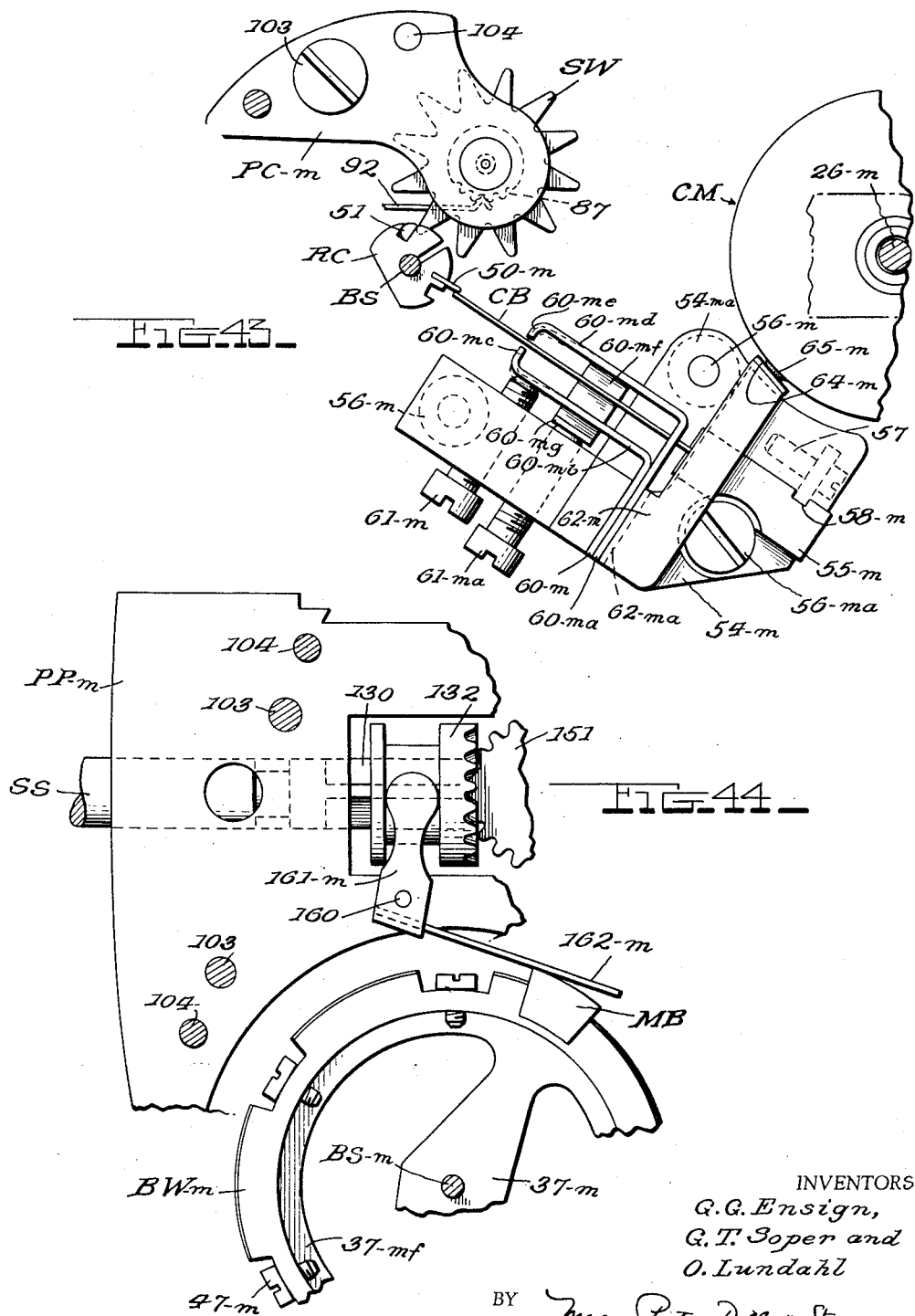

United States Patent Office 2,865,163
Patented Dec. 23, 1958

2,865,163

ELECTRICALLY-POWERED TIME DEVICE

George G. Ensign and Glenn T. Soper, Elgin, Ill., and Ossian Lundahl, Orlando, Fla., assignors to Elgin National Watch Company, Elgin, Ill., a corporation of Illinois Application April 15, 1952, Serial No. 282,388

19 Claims. (Cl. 58—28)

This invention relates to electrically actuated time measuring devices, and is particularly concerned with such devices preferably of a self-contained nature and which can operate over long periods without replacement or adjustment of parts.

Many previous proposals and structures have been made in which an electrical battery serves to maintain a balance or like system in oscillation and to operate a time-indicating train. Some commercial structures have been devised for conditions where no limitations of sizes or power requirements are present, for example clocks; while others have had minor restrictions on one or more of the size dimensions, for example automobile clocks, wherewith the current is supplied from the automobile battery and may amount to even several watts; and yet others have been made to operate from a single standard flashlight cell, with the minor restriction of providing space for such a cell and of having mechanical parts which do not so rapidly drain the cell that the timepiece requires cell replacement frequently. As a general rule, the commercially available devices have required electrical power of the order of a milliwatt as a minimum.

When it is sought to provide a wrist watch, the size and weight restrictions for commercial acceptance, with portability and lack of encumbrance equal to that of a spring-driven wrist watch, demand a contained battery and a motive device actuated therefrom which will operate over a period of a year or more, i. e., corresponding to the idle shelf life of many commercial batteries.

A feature of the invention is the provision of a chronometric mechanism of small dimensions with a self-contained oscillator system and electrical means for sustaining oscillation, and a source of power to operate said system for a long period of time.

Another feature of the invention is the provision of an electrically powered chronometric mechanism of a size such that, with its power source, it can be enclosed completely within the space between the dial and the interior surface of the back of a conventional watch case such as is employed to enclose a conventional spring-driven watch movement.

A further feature is the provision of an electrically powered wrist or pocket watch, including a watch case such as is employed to enclose a conventional spring-driven wrist or pocket watch movement, and having a power source and mechanism including dial and hands or other time indicator of a size such that they are enclosed completely within the said case.

A further feature of the invention is the provision of an assembly of a source of electrical energy, an electrically actuated rate-determining member, and time-registering means actuated thereby, combined into small volume and weight equivalent to those of present normal spring-driven watches.

A further feature is the provision of an electrically powered watch as described above having an externally accessible means for setting and resetting the position of the hands or other time indicator and concurrently preventing deleterious effects while parts are in a setting position.

A further feature is the provision of an electrically powered watch as described above having an externally accessible means for locking the power train to facilitate the setting operation.

A further feature is the provision of an electrically powered watch as described above having an externally accessible means for stopping the motor mechanism to facilitate the setting operation.

A further feature is the provision of an electrically powered watch as described above having an externally accessible means for opening a portion of the electric circuit to prevent wastage of energy while the watch is not being used.

A further feature is the provision of an electrically powered watch as described above, powered by an electrically driven motor as an integral part of the mechanism, said motor having an efficiency such that it can be operated for an extended period of time by the energy stored in a battery mounted within the case.

Another feature is the provision of a chronometric mechanism comprising an electrically actuated oscillatory rate-determining member assembled as a unit with a power take-off device, a time indicating structure including train members driven from said device assembled as a second unit, and a source of power constituting a third unit; said units being separable for individual manufacture and replacement.

A further feature is the provision of a chronometric mechanism comprising a power unit, a train unit, a battery unit, and a case; said case and units including cooperative parts for locating and maintaining said units within the case.

A further feature is the provision of a chronometric mechanism comprising an oscillatory rate-determining member and a power take-off device including an element moved to and fro by said member, the forward movement being greater than the retrograde movement, and means cooperative with said element for accurately positioning the same for movement by said member.

A further feature is the provision of a chronometric mechanism comprising a frame, an oscillatory rate-determining member on said frame, a power take-off device on said frame and including an element moved by said member, and means on the frame for designating in the absence of said element the proper positioning of parts of said device.

Another feature is the provision of an electrically actuated timepiece including an oscillatory rate-determining member, contact devices controlled thereby to effect impulsing of the same, and means for restricting the amplitude of oscillation and thereby avoiding the successional delivery of false impulses with consequent continued excessive arcs of oscillation.

A further feature is the provision of a chronometric mechanism comprising an oscillatory rate-determining member and electrically actuated means for impulsing the same; said means including a contact blade, a support for said blade connected therewith remote from an end thereof, fixed contact means located to be engaged by the blade between said support and end, and an element carried in oscillation in synchronism with said member for engaging said end of said blade and flexing the same to effect contact engagement.

A further feature is the provision of a chronometric mechanism comprising an oscillatory rate-determining member and electrically actuated means for impulsing the same; said means including a contact blade and a fixed contact for engagement thereby when the blade is flexed, a source of electrical energy and a coil for delivering magnetic impulses to the member, conductor means connecting said source, coil, blade and contact in series, and an element carried in oscillation in synchronism with said member for engaging said blade and during one oscillatory stroke of a cycle flexing the same into and holding the same momentarily in contact with said fixed contact and during the other stroke moving said blade with a non-circuit closing passing action.

A further feature is the provision of an electrically actuated timepiece including an oscillatory rate-determining member, an element carried in oscillation in synchronism with said member, and a contact device actuated by said element, together with means for controlling the position of said device relative to said element whereby to vary the time duration of the current impulse passed by said contact device.

A further feature is the provision of a timepiece including an oscillatory rate-determining member and a hairspring coactive therewith, and an element carried in oscillation with said member and cooperative with the hairspring for applying a restrictive effect to said member during excessive arcs of motion thereof.

A further feature is the provision of a chronometric mechanism comprising an oscillatory power member, electrical means for magnetically implusing said member, and means for controlling the energy transferred to said member during a magnetic impulse.

A further feature is the provision of a miniature electrically actuated oscillatory motor of such size and efficiency that it may with its power source and a time indicating mechanism be completely enclosed within a conventionally sized watch case.

A further feature is the provision of an electrically actuated chronometric mechanism, including a retarding or braking device for restricting false movement of an indicator driven therefrom.

A further feature is the provision of an electrically actuated chronometric mechanism including an oscillatory member, an inductance coil for magnetically impulsing the member, electrical contact means controlled from said member for effecting energization of the coil, and means for effecting dissipation upon breaking of the contact means of the energy stored by said coil.

With these and other features as objects in view, as will appear in the course of the following description and claims, illustrative practices in accordance with this invention are shown in the accompanying drawings, in which:

Fig. 1 is a plan of one form of movement with the dial removed and the case in section on line 1—1 of Fig. 2.

Fig. 2 is a longitudinal section through the watch case and dial, with the movement plates and battery shown in elevation.

Fig. 3 is a cross-section through the watch case, substantially on broken line 3—3—3 of Fig. 1, with the electrical battery shown partly in elevation and partly broken away.

Fig. 4 is a detail in enlarged cross-section, substantially on line 4—4 of Fig. 1, showing the assembly of power and train sub-assemblies.

Fig. 5 is a plan view of the motor unit, seen from the balance cock side, and on a scale larger than that of Figs. 1-3, with star wheel and certain parts below the balance wheel omitted for clearness.

Fig. 6 is a sectional view substantially on line 6—6 of Fig. 5, on a somewhat larger scale.

Fig. 7 is a sectional view, with the balance cock, regulator, hairspring and hairspring collet removed, substantially on broken line 7—7 of Fig. 6.

Fig. 8 is a sectional view substantially on broken lines 8—8 of Figs. 6 and 9.

Fig. 9 is a sectional view showing contact parts, substantially on lines 9—9 of Figs. 5 and 8.

Fig. 10 is an end view of the contact block, taken substantially on lines 10—10 of Figs. 5 and 8.

Fig. 11 is a fragmentary view, corresponding to Fig. 7 but with the balance parts, star wheel cock, star wheel and star wheel pinion removed.

Fig. 12 is a sectional view substantially on lines 12—12 of Figs. 5 and 8, showing a conductor strip and rectifier assembly.

Fig. 13 is a sectional view substantially on broken lines 13—13 of Figs. 5 and 8, showing power take-off parts.

Fig. 14 is a sectional view substantially on lines 14—14 of Figs. 5 and 8, showing the locations of a locating spring and a conductor clamp.

Fig. 15 is a perspective view of the electrical coil and its core and pole piece assembly.

Figs. 16 and 17 are views corresponding to parts of Fig. 8, and showing the star wheel and cooperating pin in other positions of movement.

Fig. 18 is a perspective view showing the structures and parts of the electrical circuit.

Fig. 19 is a perspective view of the base plate of the stator structure.

Fig. 20 is a plan view of the train sub-assembly of Figs. 1-4, from the side opposite the dial, partly broken away to show balance-stopping structures.

Fig. 21 is a plan view of the train sub-assembly, from the dial side, the dial being removed.

Fig. 22 is a longitudinal section through the train sub-assembly substantially on broken lines 22—22 of Figs. 20 and 21.

Fig. 22a is a fragment, corresponding to Fig. 22, showing another form of back-lash control.

Fig. 23 is a sectional view of parts of the setting mechanism, substantially on lines 23—23 of Fig. 21.

Fig. 24 is a section substantially on broken lines 24—24 of Figs. 20, 21 and 22, showing parts of the balance-stopping system.

Fig. 25 is a section substantially on broken line 25—25 of Fig. 20, showing train wheels and pinions.

Fig. 26 is a fragmentary view, showing a modified structure having a sub-center seconds wheel, and otherwise corresponding to parts of Fig. 25.

Fig. 27 is a view corresponding to a fragment of Fig. 6, but showing an adjustable motion control device included in the structure.

Fig. 28 is a sectional view through balance parts, showing a second form of overbanking control device.

Figs. 29–30 and 31–32 show further forms of overbanking control devices, respectively in plan and in section through balance parts: Fig. 30 being substantially on line 30—30 of Fig. 29, and Fig. 32 correspondingly on line 32—32 of Fig. 31.

Fig. 33 is a plan view, corresponding to a part of Fig. 8, showing another form of adjustment of a locating spring.

Fig. 34 is a perspective view of the electrical battery illustrated in Figs. 1 to 3.

Fig. 35 is a sectional view of the electrical battery.

Fig. 36 shows another form of structure, in a sectional view substantially on line 36—36 of Fig. 37, with the balance cock and balance wheel omitted.

Fig. 37 is a sectional view substantially on line 37—37 of Fig. 36, in general along the diametrical plane of the balance staff.

Fig. 38 is a sectional view substantially on line 38—38 of Fig. 36, showing the connections at one of the electrical coils.

Fig. 39 is a sectional view substantially on line 39—39 of Fig. 36, showing the electrical connections at the other coil.

Fig. 40 is a sectional view substantially on line 40—40 of Fig. 36.

Fig. 41 is a view corresponding to Fig. 5, showing a further form of structure.

Fig. 41a corresponds to parts of Fig. 41, and shows a modified construction thereof in which a permanent magnet is provided as a stator shunt.

Figs. 42 and 42a jointly show, on a larger scale, an unfolded sectional view substantially on broken line 42—42 of Fig. 41, the figures abutting at line A—A.

Fig. 42b corresponds to a part of Fig. 42a, showing the modified construction of Fig. 41a.

Fig. 43 is a view of parts in Fig. 41, substantially parallel to the pillar plate and showing contact and power take-off structures.

Fig. 44 is a fragmentary view of parts in Fig. 41, parallel to the base plate, showing the hack lever.

Fig. 45 is a view corresponding to a part of Fig. 43, showing a further modified star wheel centering device.

It will be understood that, for simplicity and clearness, certain structures and parts normal to conventional watches, such as details of plates, pinion and wheel assemblies, and jewel bearings, have been omitted from the drawings; and that the inclusion of such, if desired, is within the purview of constructional embodiments.

Case and mounting of pre-assembled parts

In the form of case and mounting illustrated in Figs. 1 to 4, the watch case has a front ring KF integral with the wall KW which surrounds the movement structures and battery and has the attachment lugs KA for supporting the pin bars KP for receiving the watch strap. The front ring KF has the usual groove for the crystal CY. The rear of the case is closed by the case back KB which is frictionally fitted into a rebate provided at the rear of the case wall KW. The case wall KW is notched for the passage of the part SA of the setting stem SS having the crown CR.

Within the cavity provided by the case members are seated the dial D which bears against the inner face of the front ring KF; a motor and take-off sub-assembly including a power unit base plate PP; a train sub-assembly mounted on a train unit base plate TP; and an electric battery B, these parts being assembled in a mounting ring MR from the dial side thereof, and this assembly then inserted through the rear of the case, in the absence of the case back KB. In Figs. 2 and 3, the structure is shown as having the sweep-seconds, minutes and hours hands S, M and H, mounted as usual between the dial D and the crystal CY. In the illustrated construction, the motor and train sub-assemblies are connected together as a unit, before introduction into the mounting ring MR, as described hereinafter.

The power base plate PP has case shoulders KS, and the train base plate TP has case shoulders KS–a. The battery B has case shoulders KS–b and KS–c. These case shoulders are engaged by the mounting ring MR which is slipped inside of the case wall KW and, being itself held by the case back KB, serves to hold the parts, including the dial, tightly against the front ring KF.

The illustrated power unit base plate PP has two projections 180, 181 which overlap parts of the train unit base plate TP, so that the parts may be assembled in rigid relative position, prior to encasing, by the screws 184, 185. Fig. 4 shows the assembly at the projection 180, and that at the projection 181 is the same save for the relative size of parts. The terminals 210, 211 of the battery B are on a wall parallel to the staff axes, and cooperate with the contact clips 72, 212 carried on the plate TP.

Motor sub-assembly

The base plate PP of the motor sub-assembly is illustratively made of magnetizable material of low permanent magnetism, i. e. remanence. As shown in Figs. 5, 6, and 19, the base plate PP has upwardly extending portions 20, 24. On the projection 24 is fixedly mounted a block 25 (Fig. 15) which is held in position by screws 26 passing through holes of block 25 which are larger than the screw stems. Block 25 supports a core piece 27 at whose free end is a stator block 28 providing a pole face between the peripherally spaced edges 29, 30 thereof. In the example of execution the pole face 28 has an arcuate angle, relative to the balance system axis, of 16 degrees. In the illustrated form, the block 25, core 27, and stator block 28 are formed integrally of magnetizable material of low permanent magnetism.

A coil C is wound on the core 27 between the end washers 34.

A balance cock BC is secured (Figs. 5 and 6) to the face of the projection 20 and carries the bearing 35 for one end of the balance staff BS, which is supported at its other end by a bearing 36 in the base plate PP.

The balance staff BS supports the diametrical crossarm 37 of the balance wheel having the rim BW made of magnetizable material of low permanent magnetism. This balance wheel rim BW has notches 40, 41, 42, 43, 44, 45; the notch 40 being shown adjacent the stator pole face 28, an illustrative position. The notches have the same peripheral dimension, which is greater in this form than the distance between the pole face edges 29, 30. The balance wheel notches receive the heads of the rating or poising screws 48 so that the heads thereof do not extend beyond the general rim periphery, whereby the mechanical clearance, i. e. the magnetic air gap, between the stator pole face 28 and the balance rim BW may be made very small. The notches 40 ... 45 in the illustrative form each have an arcuate angle, relative to the balance system axis, of 24 degrees. The pole face 28 and notch 40 are so oriented, at the beginning of electrical impulse in the clockwise balance stroke, that the edge 29 is spaced about 2 arcuate degrees from the adjacent edge 40a of the notch 40.

The balance staff BS supports the hairspring collet HC to which is fixed the inner end of the spiral hairspring HS, which, at its outer end, is pinned in the hairspring stud HD. A regulator lever RL may be positioned on the dome BCD of the balance cock BC and have the regulator pins RP for engaging the hairspring at positions of adjustment near the hairspring stud HD. The hairspring HS is shown as a spiral having a so-called over-coil HSC displaced out of the main plane of the spiral in the usual fashion, wherewith the regulator pins RP (Fig. 13) terminate short of the plane of the main part of the hairspring HS.

The balance staff BS receives a collet RC (Figs. 6 and 8) having a radially projecting fin 50 for actuating the electric contact system, and made of sapphire or like abrasion-resistant material. The collet RC also carries the axially projecting jewel pin or roller 51 for moving the power take-off star wheel SW as described hereinafter.

The base plate PP has a groove 53 (Figs. 8, 9, 10, and 19) along which may guidedly move the downwardly extending key 53a of a block 54 having a projection 55 supporting one end of the electrical contact blade CB. A screw 56 passing through the slot 57 of block 54 engages in the base plate PP for binding the block 54, 55 in its adjusted position. The movement of the block 54, 55 relatively toward and from the balance staff BS is produced by a screw 59 engaged in the block 54 and having an enlarged head engaged in a notch 58 in the base plate PP.

This movement of the block 54, 55 moves the contact blade CB essentially radially with respect to the axis of the balance staff BS, and controls the arc of overlap of the contact blade CB with the actuating fin 50 while these are in engagement. When this overlap is shortened, the time of engagement is less, and therewith the time of electrical conduction between the contact blade CB and its stationary contact 60; the length of the electrical impulse is shortened, and therewith the amount of energy delivered for magnitically impulsing the balance system. By increasing the overlap, the duration of the contact engagement is increased, and greater energy is supplied at each impulse.

The projection 55 also has a notch in which is insulatedly mounted the fixed contact blade 60 having one end bent angularly for engagement by the movable contact blade CB. The relative position of this end can be adjusted by the screw 61 (Figs. 8, 9 and 10) mounted in the block 54. The blade 60 is illustrated as formed integrally with an extension portion 62 which bears against the terminal 65 on the coil C.

The other terminal 69 of the coil C is engaged by a conductive yoke 66 which extends arcuately over the coil C to a point opposite the terminal 65 (Fig. 12) and mechanically engages and holds the rectifier SC against the extension 62 so that this rectifier is electrically in shunt to the coil C. It will be noted that the yoke 66 imposes no lateral displacing force upon the coil. A spring clip 70 is formed as an upstanding end of a conductor strip 71 which extends across the train base plate TP and has a spring contact end 72 for engaging one terminal of the battery B, as described hereinafter. A clamping block 74 is held to the base plate PP by a screw 75 and presses a piece of insulation 76 against the conductor strip 71, and this in turn against the insulating block 68 which preferably is cemented onto the base plate PP.

Except for the contact clip ends 70, 72 and the portion engaged with the rectifier SC, the conductor strip 71 is insulated electrically, preferably by the coating 76 applied with thermo-adhesion heating before assembly, from the train base plate TP, along a groove 71a in which (Figs. 12 and 22) it passes and in which it is clamped by block 74a and screw 75a. An insulating block 73 prevents contact of the end contact clip 72 with the train base plate TP if the battery is forced too far toward the train sub-assembly.

The base plate PP supports a star wheel cock PC, held in place by a screw 83 and steady pins 84. This star wheel cock PC (Figs. 6, 7 and 13) has a bearing 85 which cooperates with bearing 85 in the base plate PP to support the star wheel pinion 87 having the pivots 86 and supporting the star wheel SW, which in the illustrative form has ten teeth which successively come into the path of movement of the axially extending jewel pin 51 on the collet RC. In the illustrated form, the shapes and sizes of the teeth in pinion 87 and in the transfer wheel 106 meshing therewith provide a permissive back lash of 7 degrees in the pinion 87. A block 90 is mounted in a groove 89 (Figs. 8 and 14) on the base plate PP and is held fixed by a screw 91 passing through a hole 93 in an elevation 91s on the base plate PP, so that its head binds the block 90, and supports a locating spring 92 having a bent free end, with a bight 93 positioned for engagement in the gaps between adjacent teeth of the pinion 87, and effective for acting against these teeth for positioning the successive star wheel points in a predetermined angular position relative to the line between the axes of staff BS and pinion 87, while the star wheel is momentarily at rest. By loosening the screw 91, and moving the block 90 along the groove 89, the position of the end of the locating spring 92 may be shifted, and therewith the angular positions occupied by the pinion 87 and the star wheel SW while at rest, thus controlling the position of the star wheel points, illustratively SW–a, at the instants of engagement by the jewel pin 51.

It is preferred to provide witness marks for assistance in preliminary setting and adjusting these parts. As shown in Fig. 11, this can be accomplished by having a mark 94 on the base plate PP, so located that when the locating spring is without tension, e. g. with the pinion 87 removed, the end of the spring 92 is at the witness line 94 as shown by the full line position of the spring 92; this assures that a proper tension, neither too high nor too low, is present in the spring 92 when in its position (dotted lines) of cooperation with the pinion 87. Further, the witness mark 94 can have a branch to indicate a proper position of the bight 93, to which the bight is brought by sliding adjustment of the block 90 and there held by the clamping screw 91, preliminary to the mounting of the star wheel pinion, star wheel, and star wheel cock; this position permits determination by inspection as to proper overlap of the jewel pin 51 and the points of the star wheel. Further, a witness mark 95 is placed on the base plate PP at a point visible past the balance cock BC and star wheel cock PC, and past balance parts, for a final accurate adjustment of the proper position of the star wheel points while at rest; which position is attained and assured by loosening the clamping screw 91, causing a further minor movement of block 90, and then clamping the same again. It thus is possible to obtain highly accurate settings without operational movements of the parts.

The balance wheel rim BW has a pin 98 for engagement by a balance stopping structure as described hereinafter. The balance rim BW has a chordal notch 233 in which is fixed a spring wire 234 that projects chordally inward (Fig. 5) and has a down-turned inner end 235 (Fig. 6) for engagement with the outer hairspring turn, as described hereinafter.

*Power take-off operation*

The balance system oscillates in the usual fashion. It receives an impulse magnetically at each cycle of oscillation. Therewith, the roller collet RC moves its jewel pin 51 in a path which intersects the points of the star wheel SW, and thus the train is driven as shown in Figs. 8, 15, 16 and 17.

In Fig. 8, the parts are shown at neutral axis, that is, in the position at the start of the indexing movement of the star wheel SW, the balance system being assumed in its clockwise stroke as indicated by the arrow. At the start of the indexing movement, the jewel pin 51 encounters one point, illustratively point SWa, of the star wheel, and produces a relative counterclockwise movement of this star wheel by an angular distance of, for example, slightly greater than 20 degrees for a star wheel having ten points; and then the jewel pin 51 in its circular path leaves the path of the tip of the star wheel point SWa (Fig. 16) and the balance system continues in its clockwise stroke without further action upon the star wheel. While the star wheel was at rest (Fig. 8), the locating spring 92 had its bight 93 engaged in the gap between two teeth of the pinion 87, to assure the proper presentation of the illustrative point SWa for engagement by the jewel pin 51. When the star wheel SW is driven as stated, a tooth of the pinion 87 acts on the locating spring 92 to press it away from the pinion axis; and when the jewel pin 51 (Fig. 16) is about to leave the path of the tip of the star wheel point SWa, this locating spring 92 has not yet returned relatively inwardly into deepest position in the next tooth gap of the pinion 87, but is presenting an inclined surface against the pinion tooth which has just passed (Fig. 16), and the locating spring 92 now acts upon the star wheel system concurrently with the action of the jewel pin 51 upon the star wheel point SWa, and the star wheel is thus accelerated in its motion, and draws away from the jewel pin 51 until the locating spring 92 has fully entered and engaged in this next tooth gap of pinion 87. Thus, the locating spring 92 now holds the star wheel in its rest position, but with the next succeeding point SW–b occupying the position previously occupied by point SWa in Fig. 8; i. e. a star wheel movement of 36 degrees has occurred. This acceleration of the star wheel also serves to remove the train load from the jewel pin 51.

Simultaneously with the power take-off by the action of jewel pin 51 upon the respective star wheel point, the fin 50 is causing closure of electrical contact by the blade CB, and therewith impulsing is occurring; so that a part of the electromagnetically induced force or impulse upon the balance is being immediately employed for the train drive, and the balance is in effect a coupling member for transmission of the train-driving power from the motor stator to the star wheel without storage of this power in the balance. Further, the contact fin 50 acts through an arc of 12 to 15 degrees, in a permissible adjustment of the blade CB, and this is distributed about equally at each side of neutral axis so that little effect is produced for changing the balance system from its natural rate.

During the return or idle stroke of the balance system in the illustrative form, the jewel pin 51 passes the star wheel point SWa (Fig. 17), which has just been pushed forward, but engages against the forward edge of the succeeding star wheel point now SWb, and causes a retrograde rocking movement of the star wheel SW by an angle of, say, 7 degrees into the dotted line position of Fig. 17; and then escapes therefrom. During this retrograde movement, the aforesaid illustrative backlash permits movement of the pinion 87 without producing a retrograde movement of the wheel 106 meshing therewith. This minor retrograde movement of the star wheel SW has caused the pinion 87 to lift the locator blade 92 slightly, but upon escape of the jewel pin 51, the locating spring 92 again restores the star wheel to the normal rest position of Fig. 8, but now with the point SWb in the position previously occupied by the point SWa in the prior cycle.

The step-by-step advancement of the star wheel, through total angles of 36 degrees for each intermittent movement of the illustrative ten-point star wheel SW, continues, and the pinion 87 transfers this movement into the train structure by producing movement of the wheel 106, and therewith movement of the seconds, minutes, and hours hands.

Modified mount for locating spring

The modified structure of Fig. 38 shows another manner of supporting and adjusting the locating spring 92, in which the locating spring 92 is supported by a block 90a having a slot 93 for the locking screw 91. A screw 91a is threaded into the block 90a and has its axis substantially parallel to the base plate PP and to the spring 92, with its collar 91b engaged in a notch 89b of the base plate, wherewith the screw 91a can be rotated for moving the block 90a toward and from the axis of the star wheel, for adjusting the angular position of the star wheel points. This form of construction also includes a screw 91c engaged in the block 90a, and bearing against the locating spring 92, wherewith adjustment may be made of the spring tension being exerted against the faces of the teeth of the pinion 87.

Electrical circuit

The parts of the electrical circuit are shown in perspective in Fig. 18. The battery B has its terminal 210 presented in electrical contact with the spring clip 72 on the conductor strip 71 which passes (Fig. 12) along a groove in the train base plate TP and has the clip end 70 adjacent a terminal 69 of the electrical coil C. The other terminal 65 of the electrical coil electrically contacts the extension 62 of the side contact 60 which is mounted in the block 54, 55. The yoke 66 (Figs. 6 and 18) fits closely around the coil C at parts adjacent the terminal 69 for secure electrical connection with the terminal 69; and arches over the coil and engages the rectifier SC at the outer conductive face thereof for pressing the inner conductive face against the extension 62 and holding the latter against the terminal 65 both mechanically and electrically. The clip end 70 resiliently engages the yoke 66 essentially in line with the terminal 69 for secure electrical connection of these several parts.

The other terminal 211 of the electrical battery B is in electrical contact with a clip 212 (Figs. 20, 21 and 24) carried by and grounded to the train base plate TP, and thus in electrical conductive relation with all non-insulated parts of the structure, including the block 54, 55 and the contact blade CB, as indicated by the grounds in Fig. 18.

When the contact blade CB is away from the stationary contact 60, essentially no current flows through the system from the battery.

When the contact fin 50 in its clockwise stroke (Fig. 8) engages the contact blade CB and moves it into engagement with the end of the stationary contact 60, a circuit is closed, which may be traced from the battery B by terminal 210, clip 72, conductor strip 71, clip 70, yoke 66, terminal 69, through the electrical coil C to the terminal 65, thence by extension 62 to the stationary contact 60, contact blade CB, block 54, 55, to the frame as a common ground, with return by the clip 212 to the terminal 211 of the battery B. This current flow is in the same direction as that which has been imposing a static potential on the rectifier SC, and hence this rectifier conducts no more current than before. This current energizes the coil C, and an impulse is delivered to the rim BW of the balance system.

Shortly after this making of the circuit, e. g. a few milliseconds, the contact fin 50 in its clockwise movement (Fig. 8) frees the contact blade CB, so that the circuit is again interrupted between the blade CB and the stationary contact 60. At this time, the coil C has maximum magnetic effect, and its induction tends to cause the current to continue to flow in the same direction as the stated impulsing current, that is, from the terminal 69 to the terminal 65. This would normally cause a sparking between the contact blade CB and the stationary contact 60 at the moment of breaking: but in the described system, the current derived from the collapsing magnetic field can flow through the strip 66 and the rectifier SC, so that the coil is essentially short circuited and rapidly loses its induced voltage: it being noted that the counter-electromotive force across the rectifier SC which is present while current is flowing from the battery, is no longer present to inhibit this discharging flow from the coil C in the "passing" direction for the rectifier SC.

Magnetic impulsing operation

Each time the electrical circuit is made by engagement of contact blade CB with the stationary contact 60, current energizes the electrical coil C and thus magnetizes the base plate PP and the pole piece 28 located in the plane of and closely adjacent the magnetizable balance wheel rim BW. The parts have been shown in Figs. 7 and 8 with the balance system near the neutral axis, so that the fin 50 has just moved the contact blade CB to engagement with the stationary contact 60 and the current is beginning to flow, it being noted that the balance assembly is now turning in its clockwise stroke as indicated by the arrows in Figs. 5, 7 and 8. This magnetization of the pole piece induces opposite magnetization in the balance rim BW, so that the stationary pole face 28 attracts the part of the rim between notches 40 and 45, with a magnetic air gap existing between the parts closely adjacent the edges 29 and 40a: these forces acting to add to the kinetic energy of the balance system whereby to maintain it in motion against frictional losses and the like, and also providing at this instant the energy for beginning the movement of the star wheel SW. This occurs at the neutral axis, when the balance is moving at maximum velocity: and the impulse effect is essentially symmetrical relative to the neutral axis, so that rate disturbance is minimized. Shortly thereafter, at a time determined by the adjustment of the block 54, 55 and the overlap of the contact blade CB with the fin 50, the contact blade CB is released and leaves the stationary contact 60. The field in the electrical coil C collapses by discharge of induced current through the rectifier SC, so that by the time that the part of the rim BW has come opposite the pole face 28, the magnetic energization has been dissipated, and there is thereafter essentially no magnetic drag upon the free further oscillatory movement of the balance system.

In this illustrative form, the magnetizable material of the balance rim is opposite the power base plate PP, likewise of magnetizable material, and the flux path is closed by so-called leakage effects therebetween; it being noted that large areas are presented for the purpose so that the local magnetic density in such air gap is low and that the areas of the respective parts are essentially constant during the period of energization. In this illustrative form, the low remanence of the materials used is effective, in conjunction with the rapid dissipation of the magnetic field due to the action of the rectifier SC, essentially to eliminate magnetic couplings except during the energization period.

In the form illustrated in Figs. 5, 8, 9, 10, and 18 the electrical circuit is only closed during one stroke of each cycle, being the clockwise stroke in Fig. 7: because the fin 50 moves the contact blade CB away from the stationary contact 60 during the return or counterclockwise stroke.

*Train sub-assembly*

As shown in Figs. 20 to 25, the train sub-assembly or unit includes the train base plate TP of Figs. 1–4, upon which are mounted two bridges 100, 101, respectively secured by screws 103, with use of steady pins 104. Bearings in the train base plate TP and the bridge 100 support a pinion 107 with pivots 105, on which pinion is fixed a wheel 106, illustratively of sixty teeth, in mesh with the star wheel pinion 87. The pinion 107 has twenty teeth and is in mesh with a wheel 109 of fifty teeth and carried by the center-seconds pinion 111 having eight teeth and formed with pivots 110. The pinion 111 in turn is in mesh with the wheel 112, of sixty-four teeth, mounted on the pinion 114 having eight teeth and formed with pivots 113. Pinion 114 is in mesh with the wheel 115 of sixty teeth mounted on the hollow minutes staff 116, which (Fig. 22) carries the cannon pinion 117 having fifteen teeth in mesh with the wheel 119 of forty-five teeth, on the minute pinion 120 carried by a pin 121 (Fig. 22) projecting from the train base plate TP. This minute pinion 120 has twelve teeth and is in mesh with the hour wheel 123 of forty teeth and having the hub 125 carrying the hours hand H.

The sweep-seconds or center-seconds pinion 111 is carried by a bearing in the bridge 100, and is guided in the hollow minutes staff 116 in usual fashion. The hollow minutes staff 116 is carried by bearings in the train base plate TP and in the bridge 101. The hours hub 125 surrounds the cannon pinion 117 and is supported against excessive endwise movement by the rear face of the dial D and by the face of the pinion 117. The pinion 114 is carried by its pivots 113 in bearings in the train base plate TP and the bridge 100.

In the illustrative 300-beat balance system, the ten-point star wheel SW turns fifteen times per minute, and its pinion 87 advances by 150 teeth per minute, and drives the wheel 106 with a speed reduction of 6:1, so that the wheel 106 and the pinion 107 turn two and a half revolutions per minute, and the pinion 107 with a 5:2 speed reduction drives the wheel 109 and the seconds pinion 111 at one revolution per minute and thus operates the sweep or center-seconds hand S; the pinions and wheels 111, 112, 114, 115 accomplish a total speed reduction of 60:1, so that the minutes staff 116 turns at one revolution per hour. The cannon and transfer systems including pinions and wheels 117, 119, 120, 123 accomplish a 12:1 speed reduction, so that the hours hub 125 turns once in twelve hours.

A back-lash control is shown in Fig. 22, for preventing erratic, particularly retrograde, movements of the sweep seconds pinion 111 and its seconds hand S. A spring braking element 175 is held to the train bridge 100 by a screw 174, and has its curved end 176 bearing with a light detaining friction against the sweep seconds wheel 109.

An alternative back-lash control is shown in Fig. 22a, in which the spring braking element 175a is held to the train bridge 100 by screw 174, and bears against a smooth part of the pinion 114.

Such a back-lash control prevents erratic movements of parts which might obscure accurate indication of time, or might be distracting by forward-and-back pulsations of a hand. It is of particular advantage with the permissive back-lash described between the pinion 87 and wheel 106 with employment of the star wheel as a take-off element.

*Setting and balance-stopping arrangement*

The setting stem SS (Figs. 22 and 23) extends through an aperture in the train base plate TP and has a squared portion 130 and a round pivot end 131 supported also in the train base plate. The squared portion 130 receives a slidable grooved clutch sleeve 132 having a conforming bore hole so that it is rotated when the stem SS is rotated, but the sleeve may be shifted axially along the squared portion 130 of this stem. The setting stem SS has a peripheral groove 134 into which engages (Figs. 22 and 23) the pin 135 of a rocker 136 which is held to the train base plate TP by a screw 137; the pin 135 moves in a hole 138 of limited size, provided in the train base plate TP, and thus limits the endwise movements of the setting stem SS.

A sleeve 139 (Fig. 24) is force-fitted in the train base plate TP and supports the rockable crank lever 140 which is held against axial movement by the screw 141 threaded into the sleeve 139. The crank lever 140 has an arm with rounded sides which fit against the walls of the peripheral groove in the clutch sleeve 132, this arm having at one edge near its end a nose 142. A second arm 143 of the rock lever bears against one end of a spring 144 which is held to the train base plate by a stud 145, whereby a constant effort is being exerted, tending to rock the lever 140, 143 in a counterclockwise direction in Fig. 21.

The rocker 136 (Figs. 21, 22 and 23) has a nose 148 cooperative with the nose 142 on the lever 140. When the setting stem SS is pulled out, that is, moved toward the right in Figs. 20–22, its peripheral groove 134 carries the pin 135 with it and thus moves the rocker 136, so that the nose 148 thereof moves along the nose 142 and causes the lever 140 to rock in a clockwise direction (Fig. 21) against the action of spring 144 and therewith to move the clutch sleeve 132 toward the left in Fig. 21, that is, the sleeve 132 moves oppositely to the movement of the setting stem SS. This movement of lever 140 and the sleeve 132 continues until the tips of noses 148, 142 are opposite one another, after which a further movement of the setting stem SS permits the lever 140 to be rocked slightly counterclockwise by its spring 144, after the noses 148, 142 have passed one another: this brings the parts to a "setting" position in which they are held during the setting of the hands. Upon pushing the setting stem SS inward again, the pin 135 moves the rocker 136 in the opposite direction, and the nose 148 again slightly moves the lever 140 in a clockwise direction, until the noses 148, 142 pass one another, whereupon the spring 144 can take charge, and cause the lever 140 to return to the position shown in Fig. 21, carrying the sleeve 132 with it.

The sleeve 132 is formed with crown teeth 150 which can mesh with the idler gear 151 carried by a pin 152 (Fig. 22) on the train base plate TP, and being itself in mesh with the cannon pinion 117. Thus, when the lever 140 has been rocked in a clockwise direction (Fig. 21), this meshing engagement occurs, and a rotation of the setting stem SS turns the sleeve 132 and its crown teeth 150, thus turning the idler gear 151 and causing the cannon sleeve to rotate for moving the minutes hand in the usual fashion, with transfer through the pinions and wheels 117, 119, 120, 123 in the usual way, with movement of the hours hand.

A pin 160 on the train base plate TP pivotally supports a balance-stopping lever 161 (Figs. 20 and 24), having its end engaged in the groove of the sleeve 132, and being rocked thereby. The lever 161 supports a first spring finger 162 which extends toward the balance wheel rim BW, and cooperates with the pin 98 located on this balance wheel: the finger 162 is out of the path of the pin 98 when the setting mechanism is disengaged with the setting stem SS pushed in; but when the setting stem SS is drawn out, the parts cause a clockwise rocking of the lever 161 in Fig. 20, so that the spring finger 162 moves into the path of the pin 98 and detains this pin and therewith stops the balance wheel from further oscillation.

This balance-stopping finger 162 is thus effective, when the setting stem SS is in outward or setting position, to detain the balance system at a position about 90 degrees from the neutral axis, so that the fin 50 cannot engage the contact blade CB and close the circuit. This provides a simple way to prevent the battery being drawn upon prior to the delivery of the watch to the customer; as the watch can be shipped in "setting" condition: the retailer at the time of delivery performs the normal operation of setting to time, and depresses the crown CR, whereupon the balance system begins to oscillate immediately, due to the partially-stressed condition of its hairspring, and the electrical system begins impulsing the balance. This finger 162 also serves during subsequent setting operations to prevent the balance from moving during times when the forces of setting are holding the train, and this avoids contact of the jewel pin 51 with the star wheel SW at times when this star wheel cannot move.

A second spring finger 164 mounted on the balance-stopping lever 161 has a bent end positioned in the plane of the wheel 112, so that when the lever 161 is rocked clockwise (Fig. 20) the finger 164 engages between two teeth of the wheel 112 and stops the train from turning: thus locking the train so that the setting is accomplished by slipping between the cannon sleeve 117 and the hollow minutes staff 116 in the manner customary for escapement-type watches; and avoiding any rotation of the other train parts and star wheel SW during setting.

Upon depression of the crown CR, the inward movement of the setting stem SS causes both fingers 162, 164 to disengage and liberate the parts they have been detaining.

*Connection of motor and train sub-assemblies*

As shown in Figs. 1, 4, 5, 12, and 19, the power unit base plate PP has two extensions 180, 181 which overlap corresponding parts of the train unit base plate TP. Screws 184, 185 pass through the parts for connecting them fixedly together, so that the two-sub-assemblies can be united to a single unit, and this unit connected to the dial D before insertion in the watch case. This mechanical and electrical connection holds the plates fixedly together and at the same electrical potential, that is, that of battery terminal 211, noting Fig. 18.

The power unit and the train unit can be separately manufactured, preferably with the conductor strip 71 held clamped to the train base plate TP by the clamp block 74a (Figs. 12, 21 and 25) and its screw 75a, with the insulating pad 76a and with its ends 70, 72 projecting beyond the plate TP. During the mechanical assembly of the units, the strip 71 comes to lie upon the block 68a on the power base plate PP (Fig. 12), and the end clip 70 bears against the yoke 66. When the screws 184, 185 have been tightened, the strip 71 can also be secured in place on plate PP by bringing the block 74 (Figs. 5 and 12) into place and clamping it by the screw 75. The strip 71 is thus protected by train structures while the units are separated.

The dial D is illustrated (Fig. 22) as having the foot pins 186 which enter corresponding holes in the train base plate TP, and are secured by screws 187, so that the assembly of dial, motor structure, and train sub-assembly, with the hands in position, can be introduced into the watch case.

*Modified train with sub-center seconds hand*

The assembly permits manufacture of a watch with sub-center seconds hand in lieu of center or sweep-seconds hand, if so desired. Such an arrangement is shown in Fig. 26, in which the pinion 107, having the wheel 106 driven from the star wheel pinion 87, is in mesh with the wheel 109 on the center pinion 111, and is also provided with a pinion 126 of twelve teeth which is in mesh with a seconds wheel 127 of thirty teeth carried by a sleeve 128 rotatable about a pin 129 fixed in the power base plate PP, wherewith the sleeve 128 performs one revolution per minute, and thus drives a seconds hand at the proper rate.

*Control of motion of balance system*

It has been found desirable to provide means for controlling the amplitude of motion of the balance system.

In horological mechanisms having a pallet or the equivalent, the rate of the movement depends somewhat upon the arc traversed by any part of the balance during its oscillation. In particular, the length of the arc has an influence upon position error. It is customary to have a spring-driven watch, for example, oscillate in an arc of about one and five-eighths turns (585°) from standstill to standstill, when the mainspring is fully wound: with this arc decreasing during unwinding until the oscillation is about one and an eighth turn (405°) at the time when the spring barrel and mainspring have unwound for 24 hours or more. In such horological mechanisms, the energy input at impulsing can be adjusted to control the amplitude in various ways such as changing the mainspring, changing the adjustment of the escapement, etc. Motions in excess of one and five-eighths turns, e. g. as produced by shaking or twisting the case, are not necessarily harmful with a pallet, because the pallet fork has been moved by the roller pin at neutral axis and is held in its moved position by the escape wheel; and hence even if the roller pin performs a further arc of nearly 360° (total arc of nearly two turns), the roller pin may merely engage and rebound from the back of the pallet fork, and thus does not displace the pallet so that the fork will not properly receive the roller pin during the return stroke; and this excess of arc beyond the normal is rapidly consumed by friction because the energy of each impulse will be no greater than before.

With an electromagnetically actuated balance system, the frictional effects in the balance and train will vary from unit to unit, and there may likewise be variation in the batteries, both when new and during their effective lives. Thus, it is desirable to control the energy content of each impulse, and to prevent excessive amplitude of oscillation: noting especially that if an electrically-driven system swings for two turns (i. e. 360° past neutral axis), a second impulse is delivered.

One control of the energy content per impulse is that of adjusting the length of electrical contact through movement of the block 54, 55 as described above.

Another manner of controlling the motion in a given assembly of mechanism and battery is illustrated in Fig. 27, in which the pole piece 28 has a threaded aperture for receiving a screw 230 of magnetic material of low remanence. By rotating this screw, its end may be brought closer to or farther from the base plate PP of magnetizable material, thus varying the magnetic air gap at point 231, forming an adjustable magnetic shunt across the normal magnetic flux path through the balance wheel, and thus regulating the energy content of the successive impulses.

A third method is to have the holes in block 25 (Fig. 6) larger than the screws 26, and to move the coil and pole piece assembly toward or from the balance axis whereby to vary the magnetic gap, and then fix the position by tightening the screws 26.

One overbanking control has been described and illustrated in connection with Figs. 5 and 6, and includes the wire end 235 acting upon the outer turn of the hairspring HS. With it, as the balance system swings through non-excessive arcs, there is no contact of the wire end 235 with the hairspring and no stop function is exhibited even at the maximum expansion of the hairspring. As the arcs become undesirably high, the hairspring expansion brings its outer turn into the path of the wire end 235 as this travels with the balance rim, and a powerful frictional braking action results that rapidly damps the excess and arcs above the thus-predetermined desired maximum are not maintained. The parts can be manufactured for the desired maximum arc by locating the slot 233 at a proper part of the balance rim, and the final adjustment made by bending the wire 234.

Another overbanking control is illustrated in Fig. 28, in which the diametrical arm 37 of the balance wheel BW carries a damping pin 235-a having a function like that of wire end 235.

In the modified form of overbank control shown in Figs. 29 and 30, the arm 37 of the balance wheel rim BW tightly supports a pin 236 having a widened head 237 formed as a blade having equal masses at each side of the axis of pin 236: thus, rotation of the pin 236 and its head 237 have no influence upon the poising of the balance assembly, nor a significant effect upon the radius of gyration. By rotating the head 237 about the axis of the pin 236, it can be adjusted to a position in which it is encountered by the outer turn of the hairspring HS at the point when the balance assembly has made its maximum desired arc, and thus likewise exerts a braking action to prevent overbanking.

In the form of overbanking control shown in Figs. 31 and 32, the arm 37 of the balance wheel rim BW carries a pin 233 as in Fig. 28. The outer turn of the hairspring HS has a small block 240 fixedly secured thereto and of such a size and at such a position that this block passes the pin 233 whenever they approach under condition that the balance has made less than one and a half turns for example, being the motion determined as a desirable maximum. When the motion comes to maximum, however, the block 240 moves outward until it is in the path of the movement of the pin 233, and the parts thus engage and stop further movement of the balance wheel. It will be noted that this occurs beyond the normal point of standstill or turn-around in the balance motion, and hence the action occurs only when undesirable overbanking is present; and the parts have no effect upon motion below the pre-set maximum.

*Electrical battery*

An electrical battery suitable for employment in an electrical watch is shown in Figs. 1–3, 18, 34 and 35. This battery fits within the case, and rests at its upper face (Fig. 2) against the rear surface of the dial D, having the beveled upper surfaces 250, 251 for conformation, with a flat surface 252 forming therewith one side of the battery. The peripheral surfaces 253 are spaced from the inner wall of the case (Fig. 1) for reception of the mounting ring MR; and the top beveled walls 250, 251 have projections KS-b and KS-c which are engaged by this mounting ring, wherewith the battery is supported against movement between the case front ring KF and the case back KB. As the illustrated case back KB is beveled at its outer periphery (Figs. 1 and 3), it is preferred to provide corresponding beveled surfaces 256 on the battery at the side remote from the dial (Figs. 3 and 41) conforming with the shape of the case back, and surrounding the central flat wall 257. Thus, the battery has a casing provided by thin walls of the afore- said shape and preferably formed integrally of a plastic material resistant to the electrolyte.

A suitable cross-section is shown on enlarged scale in Fig. 35, in which the open end of the battery casing, made of a suitable plastic, has a rabbet providing a shoulder 258 for receiving the closing cover 259, which may also be of plastic and is hermetically sealed in place. Internally, the battery has an anode BA and a cathode BC separated by a space BX within which, and surrounding the electrodes, is the electrolyte. In the illustrative form, the contact pins 260, 261 are secured mechanically and electrically within the electrodes BA and BC, and project through closely fitted openings of the cover 259 and are formed at their respective outer ends to provide the terminals 210, 211.

*Electric coil*

A coil construction for the motor drive in Figs. 1–18 is shown in perspective in Fig. 15. Such a coil may be fabricated by preparing the core 27 with its end piece 25 of magnetizable material of low remanence; the structure may be formed integrally by machining a block of material, by pressing resin-iron powders in a mold, or from joined parts. The other end of the core 27 has an axial hole 27a. End washers 34 are positioned, and the pole face piece 28 with its stem 28a is engaged, and the stem tightly force-fitted into the hole 27a (Fig. 6). It is then preferred to heat treat the material for optimum permanence, and then employ an insulating lacquer to coat the surfaces and fix the washers 34. The coil is wound with insulated wire in the usual way. It may then be saturated with an insulating compound. The ends of the winding are left projecting outwardly, with the outer end 265 brought near the center of length thereof, in the illustrated form. The inner end 266 of the winding is brought out adjacent one of the end washers 34. These wire ends are bared and pressed down upon the outer surface, and then drops of an electrically conductive lacquer or cementing composition are applied thereover to secure the wire ends tightly to the structure in positions for engagement by the clips 62, 66, 70, both mechanically and electrically by reason of the adhesion and conductiveness of such a mixture when set, thereby forming the terminals 65, 69 on the coil (Figs. 12 and 15).

Another form of construction according to this invention is shown in Figs. 36–40. The differences in this form from that shown in Figs. 1–25 are that the pillar or base plates are positioned adjacent the dial, a diametrically opposed pair of coils is provided, and variations in detail are given in other parts.

The base plate PP–h supports a balance cock BC–h which has a bearing for supporting one end of the balance staff BS–h, as before. Either the balance wheel rim BW–h and its cross-arm 37–h, or both, may be formed of magnetizable material of low remanence, and the other of non-magnetizable material such as brass. Two blocks MA and MB of magnetizable material of low permanent magnetism or remanence are fixedly mounted on the rim, being located at the ends of the diametrical arm 37–h in the illustrated form, and projecting beyond the periphery of other parts of the balance rim BW–h. The balance staff BS–h supports the roller collet RC which has a fin 50 and a jewel pin 51.

The balance cock BC–h is formed of magnetizable material of low permanent magnetism, and provides a magnetic yoke connecting the cores 27–h of the electrical coils C–ha, C–hb, being provided with single pole faces 28–h which are diametrically opposite one another across the axis of the balance system.

The contact system (Fig. 36) for this form of practice includes the contact blade CB which is mounted on an arm 55–h of a sliding block 54–h movable along the base plate PP–h relative to the axis of the balance system, the movement being effected by rotation of the screw 57 which has a collar engaged in a notch 58 in the base plate, as before. The stationary contact 60–h in this form of construction is insulatedly carried in the block 55–h as before, but has its contact end positioned at the side of the contact blade CB opposite the block 54–h; and the other end of the contact member is provided by a curl 62–h engaging the end of conductor strip 68–h, which in turn engages the contact 65–h of the electrical coil C–ha. The screw 61–h passes through the block 54–h and can be rotated for adjustment of the position of the stationary contact 60–h relative to the contact blade CB.

A star wheel cock PC–h (Fig. 36) is mounted on the base plate PP–h and supports one end pivot 86 of the star wheel pinion 87 on which is mounted the star wheel SW, the pinion and star wheel each having ten teeth as before. The locating spring 92 has the part 93 engaged in the gaps between pinion teeth and is mounted on a block 90–h which can be moved on the base plate PP–h relatively toward and from the axis of the star wheel by a screw 91–h having a collar engaged in a groove 89–h of the base plate. In this form of construction, as in Fig. 33, there is adjustment of the locating spring not only in the direction of its length for thereby determining the position of the points of the star wheel SW, but also a screw 94–h extends through the block 90–h and can be employed for controlling the relative pressure of the locating spring 92 upon the teeth of pinion 87. The star wheel SW presents its points successively for engagement by the jewel pin 51 as before, and operates as a power take-off element in like manner.

In Fig. 36, the adjustable sliding blocks 54–h, 90–h are shown as held in adjusted position each by a pair of screws 56–h.

The circuit connection from the battery to the coils is obtained in this form of construction by engaging one contact clip 72 with one terminal of the battery as before, this clip being connected with the conductor strip 71–h which passes along a groove in the contact base plate TP–h as before, and which presents its end 66–h as a clip for engagement with the terminal 65–hb of the coil C–hb. A conductor strip 68–h has its end presented for engagement with the terminal 65–ha of the coil C–ha and is provided with insulation over other parts of its structure, being electrically contacted by the end of the stationary contact 62–h. A tie bar or link 66–hb has contact clips 66–ha, 66–hc at its ends (Fig. 36) respectively engaged with the terminals 69–ha (Fig. 38) and 69–hb (Fig. 39) of the coils C–ha and C–hb respectively. Except for intended contact areas, the strips are coated with insulation. These conductor parts are held in position and assembled with rectifier units adjacent and in shunt to each coil by the screws 75–h which pass through apertures of the link 66–hb, being insulated therefrom by spacers 80–h, through apertures in the respective conductor members 66–h and 68–h, then through the insulating washers 80–hc, and into the base plate PP–h. Between the ends of the link 66–hb, and the respective underlying conductors 66–h and 68–h, there are located a pair of small rectifier units SC in electrical contact therewith, thus being individually in shunt across the respective coils C–ha and C–hb. These are connected to their coils in the fashion and arranged to operate in the manner above described with respect to the rectifier and coil in the circuit of Fig. 18.

Thus the circuit connections are established from the battery by contact clip 72, conductor strip 71–h and its end 66–h to the terminal 65–hb of the coil C–hb, thence by the other terminal of this coil to the contact clip 66–hc and by the link 66–hb to the other contact clip 66–ha and thus to a terminal 69–ha of the coil C–ha, leaving this coil by terminal 65–ha and the contact clip 68–h and passing through the stationary contact element 62–h, 60–h, with the return completed, when the contact is closed by the balance system, by engagement of this stationary contact 60–h with the contact blade CB, and thus to the block 55–h and through the frame to a clip 212 secured to the train plate TP–h as before, and in contact with the other terminal of the battery B.

In the further form of construction shown in Figs. 41–44, the power unit and the train structures are mounted on a single pillar or base plate, and the power unit is given two electrical impulses per cycle of oscillation, these impulses being delivered to an electrical coil which is mounted with its core parallel to the balance staff.

The pillar or base plate PP–m is shaped and recessed as before to provide supports for the various staffs and other parts. The base plate PP–m has case shoulder projections KS–m which are engaged by the mounting structures and thereby the parts are maintained in a position wherein the dial rests as before against the inner surface of the front ring. The base plate extends past the center of the dial, to provide support for the staffs connected to the hands S, M, H: but terminates along a chordal line spaced from the end closing wall of the watch case, so that the battery B can be fitted in this space and thereby have a thickness from front to back closely approximating the distance from the dial to the internal surface of the case back KB.

*Plate and bridge assembly*

The base plate PP–m has bearings therein and supports bridges 74–m, 100–m, 101–m, and a cock BC–m containing other bearings whereby to support star wheel pivots 86, pivots 105 for the pinion 107, pivots 113 for the pinion 114, the center assembly of pinion 111 and sleeve 116 for the seconds and minutes hands S, M, and the hub 125 for the hours hand H. The balance cock BC–m supports a bearing for the balance staff BS–m and carries the hairspring stud HSD with its clamping screw. The center train bridge 100–m carries a bearing for the sweep-seconds pinion 111; and also a bearing for the pinion 114 which supports the seconds: minutes reduction wheel 112. The train bridge 74–m carries a bearing for the pinion 107 which supports the wheel 106. The train bridge 101–m has a portion interposed between the center train bridge and the pillar plate PP–m, and carries a bearing for supporting (Fig. 42) the hollow minutes sleeve 116. A bridge PC–m is interposed between the balance cock BC–m and the base plate and carries a bearing for supporting the star wheel pinion 87. The several bridges are held by screws 103 and located by steady pins 104.

The balance staff BS–m carries the balance wheel BW–m, with its arm 37–m, the collet HC supporting the inner end of the hairspring HS, and a roller collet RC. The collet RC has projecting axially therefrom the jewel pin 51 which actuates the star wheel SW and thus the train, and also has the contact fin 50–m which is of conductive material. By means described in detail hereinafter, electric current is supplied to the contact fin 50–m.

A block 54–m of insulating material (Figs. 41 and 43) provides a base for contact structures, and is secured on the base plate PP–m by screws 56–m. A rear portion 54–ma of this insulating base has therein a groove of triangular section for receiving a support block 55–m which is of truncated triangular section to fit the triangular groove. The support block 55–m has a notch 58–m which receives the projecting flange of a screw 57 which is threadedly engaged in the block 54–m, for adjusting movement in the directions toward and from the axis of the balance staff BS–m. A spring contact blade CB, illustratively a straight flat piece of resilient conductive metal, is fixed in the support block 55–m at the end of the contact blade remote from the balance staff, and with the free end of the contact blade projecting free of the block 55–m and into the path of oscillatory movement of the contact fin 50–m. The insulating blocks 54–m also has a groove transverse to the direction of the contact blade CB, in which groove are received the ends 60–m, 60–ma of two relatively fixed contact members, and the down-turned end 62–ma of an electrical conductor strip 62–m which lies on the upper surface of the rear portion 54–ma of the insulating base, and thus (Fig. 43) is well spaced from the contact blade CB. One edge of the insulating base block 54–m is curved (Fig. 43), to conform to the coil or electrical winding C–m. The end of the conductive strip 62–m, adjacent to the coil C–m, is bent angularly and provides a spring contact clip 64–m for engagement by the terminal 65–m on the coil C–m, as will be described in detail hereinafter.

The portion 60–m of one relatively fixed contact member is formed integral with a conductive spring portion 60–mb extending in general parallelism with the contact blade CB and having its free end 60–mc turned towards this contact blade to provide a mechanical stop for the movement of the contact blade and also providing electrical contact connection with this blade during engagement. Correspondingly the contact member portion 60–ma of the other relatively fixed contact member is integral with the conductive spring portion 60–md which also is in general parallelism with the contact blade CB, but on the opposite side thereof from the blade portion 60–mb; the blade portion 60–md has its free end 60–me bent toward the contact blade CB and likewise serves as a mechanical stop and for electrical contact connection. The blade portion 60–md has a yoke 60–mf, 60–mg connected therewith, the portion 60–mf extending beneath both the contact blade CB and the spring portion 60–mb, and the part 60–mg extending upwardly in general parallelism to but spaced from the blade portion 60–mb. It is preferred to form the structures 60–m, 60–mb, 60–mc and 60–ma, 60–md, 60–me from spring sheet metal, with the parts when at rest occupying the positions indicated by dotted lines in Fig. 43.

In assembling the parts, with the contact members occupying the dotted line positions, the spacing or distances of the mechanical and conductive contact ends 60–mc, 60–me may be adjusted and set by the respective screws 61–m, 61–ma which pass through threaded holes in the insulating base 54–m in directions essentially at right angles to the contact blade CB, and respectively engage the contact members at their portions 60–mb, 60–mg. In unstressed condition, the blades 60–mb, 60–md are at an angle of, say, 86 degrees relative to the corresponding parts 60–m, 60–ma as indicated by dotted lines in Fig. 43; so that the screws effect adjustment by the resilient yielding of the parts. In Fig. 43, the screws 61–m, 61–ma have been shown adjusted so that the contact members have been moved and stressed into the respective positions shown by full lines, wherein the contact blade CB, in unstressed condition, is located centrally between the contact points provided by the ends 60–mc, 60–me. The material forming the spring portions 60–mb, 60–md is much thicker in width and section than the material of the contact blade CB. When the contact blade CB is moved at its outer free end until it engages the contact point 60–mc, the blade CB yields, but the point 60–mc remains essentially in its adjusted position: and correspondingly when the blade encounters the contact point 60–me, this point remains in position while the contact blade CB yields.

When the contact fin 50–m moves in a clockwise direction (Fig. 43) with the balance staff BS–m, it first encounters the contact blade CB while the latter is in its neutral and unstressed condition, and then presses this contact blade CB until it engages the contact 60–mc, at which time the circuit is closed; and during this time interval, the contact blade CB has bent as an end-mounted spring member, from its point of engagement in the support block 55–m. Thus, the contact blade is not engaged with the contact 60–mc until there has been a stressing of the same, and correspondingly there is no rebound when the engagement occurs. As the contact fin 50–m continues to move in its clockwise direction, it continues to force the end of the contact blade CB in front of it, thus increasing the stress in the blade and the pressure of its engagement with the contact 60–mc; but during this time the contact blade is bending from the mechanical contact point 60–mc as a fulcrum, so that its free end is turning through an arc of lesser radius than the exposed length of the total spring CB, wherewith the contact fin 50–m will escape from the end of the contact blade CB more rapidly than if the spring were bent from its point of mounting.

When the contact fin 50–m has stressed the contact blade CB and then passes its end, the electrical circuit is immediately broken at these parts, and the contact blade CB is now free to swing back toward its original neutral position. The kinetic energy in the contact blade, as it approaches the neutral position, will cause it to overswing; even if it should engage the opposite contact 60–me at extremely close adjustment of parts, and a long contact arc at the fin 50–m, no circuit closure occurs because the contact blade CB is insulated from the pillar plate and other parts, and there is no conduction from the contact fin 50–m. During the remainder of the clockwise movement of the contact fin 50–m with the balance staff, the contact blade CB comes essentially to rest, its motion being braked in part by the successive engagement with the contacts 60–mc, 60–me until the major portion of its energy has been consumed, and thereafter by the absorption of the remaining energy by air frictional losses, etc. Thus, by the time that the balance has passed to the end of its clockwise stroke, and then approaches the neutral axis in its following counter-clockwise stroke, the contact blade CB has returned to its neutral position and unstressed condition ready for a new engagement, at its opposite face, by the contact fin 50–m. Thereupon, the contact blade CB is swung toward contact 60–me while stresses are being built up in it, until the engagement occurs with a closure of the electric circuit as before: thereafter, the free end portion of the contact blade CB, between the contact 60–me and the contact fin 50–m is further bent, this time about the contact 60–me as a fulcrum and with the aforesaid mechanical behavior, until the contact fin 50–m releases the contact blade CB, with an opening of the circuit as before.

The arcuate length of the engagement, measured from axis of the balance staff BS, from contact fin 50–m to the contact blade CB is determined by the relative overlap of these two parts when they are essentially at the neutral axis: and this in turn can be adjusted by moving the support block 55–m toward and from the axis of the balance system, by rotating the adjustment screw 57. When the parts are at proper position, the screw 56–ma is tightened, so that its head binds the block 55–m in position.

The star wheel pinion 87 has fixed thereon a star wheel SW, Fig. 43, here illustrated with twelve points, and the pinion 87 (Fig. 42) likewise has twelve teeth. Proper selection of ratios are made for wheels and pinions 106—107—109 so that the center seconds pinion 111 will turn at one revolution per minute. The points of the star wheel are successively contacted by the jewel pin 51 which partakes in the oscillatory movement of the balance assembly, as before. A locating spring 92 can be employed, as in Fig. 11.

The pillar plate has a groove 71–mg along the front or dial-adjacent face thereof leading from a notch 71–mn in the chordal edge, to a hole 71–mh located opposite the peripheral surface of the electrical coil C. During manufacture, the groove 71–mg is provided with an insulating coating and with a conductor strip 71–m. This conductor strip 71–m has angularly directed spring ends 72–m and 70–m located respectively in the notch 71–mn and projecting through the hole 71–mh as clips for respective engagement with a battery terminal and with the contact terminal 69–m on the coil C.

The preferred way of providing and mounting the conductor strip 71–m is to coat the surfaces of groove 71–mg with a liquid insulating composition which is curable to a strongly adhesive and essentially rigid condition: phenolformaldehyde, polyethylene and other synthetic resins are satisfactory. When the coating has attained stiffness, either by mere drying of the solvent if used or by curing to such condition, the strip 71–m is laid in position, and a further coating of the insulating composition is applied over it and into the spaces, if any, between the strip and the walls of groove 71–mg. While the parts are in such position, a final curing of the composition is effected: and thereafter the conductor strip is a monolith with the pillar plate itself, and the electrical connection is thus accomplished without the use of dangling and accidentally displaceable wires. The preferred final cross-section has a surface essentially flush with the surface of the pillar plate PP–m.

Opposite the other terminal of electrical battery B, a contact spring 212–m is secured directly to the base plate, so that the base plate is maintained at the same potential as this battery terminal: and therewith all parts in electrical contact with the base plate PP–m are at this potential. Thus, the balance cock BC–m and the hairspring stud HSD are at this potential, and current can flow through the hairspring HS to the collet RC on the balance staff BC and thus to the roller collet RC and to the contact fin 50–m.

As described above, current can flow from the contact fin 50–m through the contact blade CB to one or the other of the fixed contacts 60–mc, 60–me for a small duration of time while the balance system is passing close to the neutral axis. Current then respectively flows from the fixed contact 60–mc or the fixed contact 60–me by the corresponding blades 60–mb, 60–md to the contact strip 62–m and thus to the spring clip 64–m by which current is transferred to the terminal 65–m on the electrical coil C–m. The return from the coil C–m to the battery occurs by the strip 71–m described above.

It will be noted that the conductor strips 62–m, 71–m are respectively assembled with and solidly secured to sub-structures of the assembly during the course of manufacture of such assembly; that the contact system is likewise prepared in sub-assemblies, with the moving spring contact blade CB secured in the support block 55–m as one unit of sub-assembly, and the contact blades 60–mb, 60–md secured as another unit sub-assembly with the block 54–m and the conductor strip 62–m. The parts of the balance system are likewise capable of unit sub-assembly manufacture, so that the elements may be made individually and sub-assembled preliminary to a final assembly: and during final assembly there are no wire connections, soldered or screw joints, or uncertain adjustments to be accomplished.

In the construction shown in Figs. 41 and 42, a core 27–m receives an electrical winding or coil C–m, and has a pole extension 20–m constructed and assembled by staking or adhesive in an aperture of the base plate PP–m (Fig. 42). This pole extension has a long leg 20–ma opposite but spaced from the short leg 28–ma of a second pole extension 28–m held clamped to the core 27–m by a screw 26–m. The balance wheel BW–m has its rim in the space between the pole legs 20–m, 28–m.

The balance wheel BW–m is illustrated as having a thick rim structure with an inwardly projecting flange 37–mf and the diametrical arm 37–m. The rim of the balance wheel has two diametrically opposed recesses for receiving the masses MA, MB. As it is desirable that a balance wheel makes from about 1 and ⅛ to about 1 and ½ turns per stroke (that is, say from 400 to 550 degrees of oscillation), it is preferred to form one of the masses MA, MB for magnetic effect, and to have the other mass of non-magnetic material: thus, the mass MA should be of material which is essentially non-magnetizable, such as brass, and may be protected if desired by a thin coating of gold or other non-magnetizable and non-corrodible material. The mass MB is a permanent magnet presenting a north pole at the top in Fig. 42, adjacent the long leg 20–ma, and a south pole at the bottom, adjacent the short leg 28–ma. The rest of the balance wheel structure, including the rim, meantime screws, should also be of non-magnetic material. It will particularly be noted that by having the masses MA and MB separate from the balance during original manufacture, and by pairing such masses against one another for equality, it is feasible to assemble such pairs diametrically opposite one another on a balance, essentially without changing an existing poise. The masses MA, MB may be held in place by a cement, preferably a thermoplastic resin.

The operation of this motor drive structure is as follows:

When the balance wheel BW–m is in oscillation, with the permanent magnet MB approaching the air gap between the pole pieces presented by the adjacent faces of the legs 20–ma, 28–ma, magnetic effects are being induced and this mass is thus attracted as an armature, toward a position between the legs 20–ma, 28–ma. The force thus exerted appears as impulsing energy tending to accelerate the balance wheel BW–m. As the balance comes to neutral axis, the contact fin 50–m engages the contact blade CB and the electric circuit is closed wherewith the coil C–m is energized (note Fig. 43). This energization of the coil produces an opposite magnetic effect in the legs 20–m, 28–m to that which has been induced therein by the permanent magnet MB. This effect, at the standardized size of the coil and of the magnetic yoke parts and the voltage and energy received from the electrical battery B, being sufficient to override the effects of the permanent magnet, and essentially reduce the relative magnetic polarities of the legs 20–m, 28–m to zero, so that there no longer is an attraction upon the mass MB. Thus, the system operates by attracting the permanent magnet MB toward neutral axis, by the action of the pole pieces: and then reduces the magnetic effect of these pole pieces to zero, so that thereafter the balance will continue in its oscillatory motion essentially without drag from the pole pieces. When the energization of the coil C–m is terminated by opening the electrical circuit, the decrement of magnetic effects in the yoke occurs at such a rate that the system does not become strongly attractive until the magnet MB has moved so far past neutral axis that there is essentially no checking of the continued movement of the balance. When the balance has come to a standstill by storage of energy in the hairspring HS, and then makes its return stroke, a similar succession of events occurs, with the magnet MB being at first attracted by the pole faces at the ends of legs 20–m, 28–m, followed by the closure of the electrical circuit by energization of the coil C–m so that the pole pieces become essentially of zero polarity and permit the balance to continue in its stroke.

For such a device, the coil C–m may have a winding of copper wire about 0.002 inch in diameter, with a direct current resistance of the order of 100 to 500 ohms.

The structure of Figs. 41a and 42b closely corresponds mechanically to that of Figs. 41 and 42–42a, except that a single fixed contact 60–mc is employed as in Fig. 8 with one resultant impulse per cycle, the mass MB is of magnetizable material of low remanence, and a permanent magnet is employed in the stator.

As shown in Figs. 41a and 42b, the permanent magnet 27–mm is formed with reduced end extensions which closely fit in corresponding apertures in the pole extensions 20–m, 28–m; and serves when the coil is being de-energized to maintain a magnetic effect opposite to that which was electrically induced by the coil C–m, and apparently then aids in dissipating the coil effect; during de-energized periods, its effect is reduced by the shunt effect of the de-energized core 27-m. This mass MB may be of soft iron, iron powder bonded by resin, or other material capable of magnetization and preferably having the property of quickly dissipating any induced magnetization when the inducing field disappears. The other parts of the balance, including the compensating mass MA are preferably non-magnetizable, as before.

When the balance wheel BW-m is in oscillation, and the mass MB approaches the air gap between the pole pieces at the ends of legs 20-ma, 28-ma, the permanent magnet 27-mm is shunted by the path through the core 27-m of the de-energized coil C-m, and essentially no effect is produced on the balance. As the leading edge of the mass MB comes adjacent the nearer edge of the stator parts, the fin 50-m engages the contact blade CB, and the circuit is closed and coil C-m is energized; and its magnetic field now opposes the effect of the permanent magnet 27-mm, and a powerful attraction is exerted upon the mass MB, thereby impulsing the balance. At this time, also, the jewel pin 51 encounters the star wheel and train movement is initiated; wherewith the balance acts as a coupling, so to speak, so that the train energy is delivered from the stator to the train essentially without storage in the balance system. As the mass MB attains a position close to that of minimum air gap in the magnetic circuit (see Fig. 41a), corresponding to neutral axis of the balance assembly, the fin 50-m releases the contact blade (Fig. 41a) and the circuit is broken, wherewith the rapid decay of the magnetic field results in little or no retarding drag upon the mass MB as the balance continues in its stroke. During the return stroke, no circuit is made, and the permanent magnet 27-mm is essentially shunted by the core 27-m as before. The effect of the permanent magnet 27-mm is to give a greatly increased efficiency to the motor system in such an arrangement, for example twice as great for that of a like structure without the shunting permanent magnet.

By making the contact support pieces 54-m, 55-m of conductive material, the structures of Figs. 41-43, and Figs. 41a and 42b, will operate with the making and breaking occurring between the contact blade CB (which is then at base plate potential) and the side contact means.

In each case, the impulsing energy delivered into the balance system in each cycle of oscillation is by design sufficient to satisfy all frictional and other losses in the balance and train systems; and to maintain this balance at substantially steady amplitude or "turns" of oscillation such as 1⅛ to 1½ turns. This energy can be applied entirely before neutral axis, when the structure acts solely by attraction with the magnetic effect of the coil C-m exactly compensating the effect of the permanent magnet; or in part ahead of neutral axis by attraction, and in part behind neutral axis by repulsion.

The structure of the balance wheel BW-m (Fig. 41) also permits the employment of three pairs of mean-time screws 47-m, with the elements of each pair located diametrically opposite one another, and with each located in a recess of the balance rim, so that there is no projection of these mean-time screws, in their final adjusted position, beyond the periphery of the balance rim: while on the other hand, the masses MB, MA project considerably beyond this rim, and always beyond the heads of the mean-time screws 47-m.

The structures illustrated in Figs. 41-44, also include a mechanism by which the hands may be set to the desired hour and minute, without thereby producing a faulty operation of or damage to the structure. The general operation is the same as in the preceding forms.

In Figs. 41 and 44, the watch stem SS has the usual crown CR, and may be drawn outwardly, in the usual way, by pulling on the crown. As before, the movement of the stem SS moves the clutch sleeve 132-m along a generally square portion 130 of the stem SS.

A pivot 160 (Fig. 44) on the base plate carries a balance-stopping lever 161-m having its end engaged in the peripheral groove of the clutch sleeve 132, and having a kerf for tightly receiving and holding the stopping spring 162-m, this spring being located at the level of the masses MA, MB on the balance wheel BW-m.

The operation of setting, and the hack effect in stopping the balance system, are as before.

*Modified star wheel centering devices*

In the foregoing structures, the star wheel SW was held with one tooth at a predetermined position, ready for advancement by the jewel pin 51, during most of the balance oscillation; and this positioning was accomplished by the centering or locating spring 92 which engages at its and with two adjacent teeth of the pinion 87 on the star wheel staff 86.

In the form shown in Fig. 45, the star wheel SW is of magnetizable material of low remanence or permanent magnetism. The magnet 90-ka is of horseshoe shape, and is adjustably held to the base plate PP-k by a screw 91-k: its pole ends 92-ka, 92-kb are opposite star wheel points SW-a, SW-d. The operation is essentially as follows:

With this arrangement, when the jewel pin 51 encounters a star wheel point at position SW-b, the star wheel is caused to move through an angle of about 20 degrees, with resistance against motion due to the attraction between the magnet pole 92-ka and the point which has been at the position SW-a, and between magnet pole 92-kb and the point which has been at position SW-d, this resistance decreasing as the magnetic gap increases. After moving the star wheel SW through an angle of 20 degrees, then the points which are respectively approaching the positions SW-a and SW-d are attracted with greater force than the points which are leaving these positions, and accordingly the star wheel is moved forward, freeing the jewel pin 51 of load. This forward movement may exceed the total 36 degrees between successive points with a star wheel of ten points, but the magnet poles 92-ka, 92-kb maintain control, and the star wheel SW is brought to a standstill, after decremental oscillations, with its next succeeding point at the position SW-a as at the beginning. This has caused a movement of the star wheel SW by one tooth, and this motion is transmitted through the train to the indicating hands.

During the return stroke oscillation of the balance, the jewel pin 51 misses the tooth at position SW-c but encounters the tooth which is at the position SW-b, and forces it in a retrograde movement through an angle of about 7 degrees, and therewith the star wheel points which are at the positions SW-a, SW-d are also moved retrograde and away from the magnet poles 92-ka, 92-kb. This permits the jewel pin 51 to return, without producing a retrograde stepping of the star wheel SW by a full point space. When the jewel pin 51 escapes from the star wheel point which it has been moving, the magnet pole 92-ka, for example, now attracts the adjacent point back to the position SW-a, and holds it thereat ready for a further forward motion of the star wheel by the next engagement of the jewel pin 51 with the star wheel point at the position SW-b.

Angular adjustment of the magnet 90-k about its securing screw-pivot 91-k permits fixing the standstill positions occupied by the star wheel points relative to the plane through the axes of the balance system and of the star wheel pivots 86.

Structures, such as jewel bearings, commonly employed in high grade horological movements, have not been set out in detail, and it will be understood to the expert that such may be included in structures without departing from this invention.

The foregoing description, and the accompanying drawings show illustrative forms of construction according to this invention, but it will be understood that these forms are not restrictive, and that the invention may be practiced in many ways within the scope of the appended claims.

We claim:

1. An electric watch comprising a case having an internally concave back, a dial in said case having a dished edge portion so that the dial has a concavity at its rear face, an electric motor and train structure located within a part of the area at the rear of the dial and leaving unencumbered a space at another part of said area, and an electric battery substantially filling the said space, said battery having convex portions for its front and rear faces for closely approximating the said back and dial.

2. In an electrically actuated timepiece, a case having supporting means therein, a motor and take-off sub-assembly located in said case, a train sub-assembly located in said case, an electric battery enclosed in said case, said sub-assemblies and said electric battery having shoulders for engaging said case supporting means for positioning said sub-assemblies and battery, means for maintaining the engagement of the shoulders and supporting means and a controlled electrical circuit between said battery and said motor for influencing the operation of the latter.

3. In an electrically actuated timepiece, a case having supporting means therein, a motor and take-off sub-assembly having shouldered engagement with said supporting means, an electric battery in said case having shouldered engagement with said supporting means, a train sub-assembly mounted in said case intermediate said motor and take-off sub-assembly and said electric battery and having shouldered engagement with said supporting means, and a controlled electric circuit between said battery and said motor for influencing the operation of the latter.

4. In an electrically actuated timepiece, a case having supporting means, a motor and take-off sub-assembly having shouldered engagement with said supporting means, an electric battery enclosed within said case and having shouldered engagement with said supporting means and having circuit contact members, a train sub-assembly in said case and carrying motor circuit contact members adapted to engage said battery contact members when the parts are in assembled position, said sub-assemblies having overlapping portions, means for securing said sub-assemblies to each other at said overlapping portions, and a controlled electric circuit between said battery and said motor for influencing the operation of the latter.

5. In an electrically actuated timepiece, a case, a supporting ring mounted in said case, a motor, take-off mechanism and train mechanism mountable in said case, means for mounting said motor, take-off mechanism and train mechanism whereby they may be placed in and removed from said case as a unit with the motor take-off mechanism and train mechanism each occupying respective parts of the area enclosed by said ring, said means and said supporting ring having interengagement whereby said motor, take-off mechanism and train mechanism are supported within said case, and an electric battery for furnishing power to said motor and having projections engaged and supported by said supporting ring and occupying another part of the area enclosed by said ring.

6. An electrically actuated timepiece having a first case member with a ring and a peripheral portion, a dial engaging said ring, time keeping mechanism including an electric power element within the case and occupying a part of the area at the rear of the dial, an electrical battery within the case and occupying another part of the said area, said battery having a peripheral surface spaced from said peripheral portion, a lug on said battery extending into the space between said peripheral portion and said peripheral surface, a mounting member in said space for engaging said lug and thereby restricting movement of the battery away from the dial, and a second case member for limiting movement of said mounting member.

7. An electrically actuated timepiece having a first case member including stop means, a dial engaging said stop means and held thereby against movement in one direction, time-keeping mechanism including an electric power element and located within the case member and occupying a part of the area at the rear of the dial, a second case member cooperative with the first case member for enclosing the said dial and mechanism, the space between the dial and second case member being unobstructed for another part of the area, a battery located in said space, and means associated with said second case member for holding the battery in position.

8. An electrically actuated timepiece having a first case member, a dial in said first case member, motor and train structures occupying a part of the area at the rear of the dial, an electrical battery occupying another part of the said area, a mounting member for holding said structures and battery as a unit for insertion in and removal from the first case member, and a second case member separably connected with the first case member and engaging said mounting member to restrict movement thereof.

9. An electrically actuated timepiece having a case member, a mounting member within the case member, motor and train structures separably carried by said mounting member, a dial secured to said structures, said structures occupying only a part of the area at the rear of the dial, a battery occupying another part of the said area, said mounting member having a part engaging a surface of the battery to prevent movement thereof, and means separably connected to the case member for holding the mounting member therein.

10. In an electrically actuated watch, a case including a caseback, a dial in the case, motor and train structures in the case and occupying a part of the area at the rear of the dial, another part of the said area being free and unencumbered and an electrical battery occupying said other part of said area and having one surface thereof closely behind the dial and the opposite surface thereof closely adjacent the caseback, said battery presenting a contact terminal at its surface adjacent said structures, and a cooperating contact terminal carried by said structures.

11. In an electrically actuated watch, a case, a dial in the case, motor and train structures in the case, a mounting member engaging said structures and providing a space behind the dial and having a wall spaced from said structures, a battery in said space and having a contact terminal adjacent the structures, a cooperating contact terminal carried by the structures, said wall being effective through the battery to maintain said terminals in engagement, said mounting member being removable with said structures from the case.

12. In an electrically actuated timepiece, a case having a peripheral closing wall, a dial at the front of the case, a base plate structure within the case and having motor and train elements thereon and hand staffs driven from the train and projecting through the dial, parts of the edge of said base plate being engaged with portions of said peripheral wall and another part of said edge being spaced from said peripheral wall, and a battery located in the case and extending into the space between said edge and said peripheral wall, said battery being connected for energizing said motor parts.

13. In an electrically actuated timepiece, a case having a peripheral closing wall and a back, a dial at the front of the case, said case wall and back and said dial defining an internal cavity, a base plate structure within the case and having motor and train elements thereon and located in the cavity and hand staffs driven from the train and projecting through the dial, parts of the edge of said base plate being engaged with portions of said peripheral wall and another part of said edge being spaced from said peripheral wall, and a battery located in the case and extending into the space between said edge and said peripheral wall, said battery being connected for energizing said motor parts, said structure and motor and train parts thereon occupying only a part of the area at the rear of the dial, where a space is left within said cavity and behind another part of the dial, and the battery occupying and essentially filling said space and connected for energizing said motor parts.

14. In an electrically actuated timepiece, a case having a peripheral wall and a back, a base plate structure in said case and a motor and time-keeping elements mounted thereon, said structure being engaged with said peripheral wall for a part of the circumference thereof, said structure and elements occupying only a part of the area embraced by said peripheral wall and leaving free a cavity bounded by said peripheral wall, said back and said structure and elements, and a battery substantially filling said cavity and connected for energizing said motor elements, the surfaces of the battery and structure remote from the said back being essentially at the same level within said wall.

15. An electrically actuated timepiece including a power unit, a train unit, and a battery unit; said power unit including a conductive frame, a balance system on the frame and electromagnetic means for maintaining oscillation therein including a coil supported on the frame, said coil having terminals; a circuit maker including a contact blade supported by and electrically connected with said frame, an actuator carried in synchronism with the balance for moving said blade, and a contact member insulatedly carried by the frame and including a conductor piece extending into engagement with a coil terminal; said train unit including a conductive base electrically connected to a battery terminal and to the power unit base, and a conductor extending from the other battery terminal and insulatedly supported on the power unit frame, and a rectifier element located between and having poles conductively engaged with the conductive base and said conductor.

16. In an electrically actuated timepiece, a case, a motor and take-off sub-assembly mounted in said case, a train sub-assembly mounted in said case, said sub-assemblies being independent units and having elements interconnectable so that a take-off element drives a train element, means for mechanically and electrically connecting said sub-assemblies, an electrical circuit including a motor circuit conductor member fixed insulatedly to said train sub-assembly and a contact member mechanically and electrically connected to said train sub-assembly, and an electric battery enclosed in said case and having terminal members which engage said conductor and contact members when said train sub-assembly and electric battery are placed within said case, said members including spring elements for the electrical connections thereat, and the case being effective to maintain tension in said spring elements when the sub-assemblies and battery are in position in the case.

17. In an electrically actuated timepiece, a case having a peripheral closing portion, a dial at the front of said case, a base plate extending past the center of the dial and occupying only part of the area at the rear of the dial, said base plate having a surface spaced from and opposite the center of the dial, a magnetically impulsed balance assembly on said base plate and having a contact actuating element partaking in the movement thereof, a contact insulatedly supported on the base plate and presenting a portion in the path of said element for actuation thereby, cooperating magnetic parts on the balance assembly and on the base plate, an electrical winding for determining the interaction of said magnetic parts, an electric battery located at the part of the area at the rear of the dial not occupied by said base plate and extending toward the dial past the front plane of the adjacent part of said base plate, and circuit connections from said battery for providing a circuit from the battery through the winding and to said contact.

18. In an electrically actuated timepiece, a case having a peripheral closing wall, an electric battery having a casing of impervious non-conductive material with essentially parallel sides, an arcuate closing wall between said sides and conforming to a part of said peripheral closing wall, and a closing end extending between said sides and between the ends of said arcuate closing wall, said battery having terminals located on said closing end; a base plate secured in said case and having an end surface adjacent the closing end of said battery, motor and train elements carried by the base plate, terminal members mounted on said base plate adjacent said end surface, conductors from said terminal members to the motor elements, and locating means supported by said peripheral closing wall to hold the battery with its terminals engaged with said terminal members.

19. In an electrically actuated timepiece, a case having a peripheral wall delimiting a space whose cross-section is bounded by said wall, a base plate structure within the case, motion transmitting means and hand staffs mounted on said structure, impulse actuated electromotive elements mounted on said structure and in driving relation to said transmitting means, said elements including a rate-determining device and an impulse-forming device controlled by said rate-determining device; said structure, means and elements occupying only a part of the cross-section delimited by said wall, and a battery located in said case and at another part of said cross-section, said battery being connected electrically to said structure and to electromotive elements for supplying impulses to said elements.

References Cited in the file of this patent

UNITED STATES PATENTS

| Number | Name | Date |
|---|---|---|
| 1,175,610 | Cove | Mar. 14, 1916 |
| 1,462,076 | Spiro | July 17, 1923 |
| 1,498,749 | Porter | June 24, 1924 |
| 1,522,178 | Favre-Bulle | Jan. 6, 1925 |
| 1,614,276 | Bulova | Jan. 11, 1927 |
| 1,853,388 | Wadsworth | Apr. 12, 1932 |
| 1,909,073 | Putnam | May 16, 1933 |
| 1,995,511 | Ingraham | Mar. 26, 1935 |
| 2,189,334 | Thiebaud | Feb. 6, 1940 |
| 2,245,596 | Lindberg | June 17, 1941 |
| 2,283,330 | Katz | May 19, 1942 |
| 2,302,260 | Rothwell et al. | Nov. 17, 1942 |
| 2,311,964 | Quebatte et al. | Feb. 23, 1943 |
| 2,372,771 | Drescher | Apr. 3, 1945 |
| 2,377,276 | Sperry et al. | May 29, 1945 |
| 2,420,827 | Kennedy | May 20, 1947 |
| 2,423,117 | Quebatte et al. | July 1, 1947 |
| 2,439,248 | Gregory | Apr. 6, 1948 |
| 2,459,930 | Fink | Jan. 25, 1949 |
| 2,500,557 | Marti | Mar. 14, 1950 |
| 2,523,298 | Haydon | Sept. 26, 1950 |
| 2,531,966 | Berge | Nov. 28, 1950 |
| 2,564,636 | Bennett et al. | Aug. 14, 1951 |
| 2,572,989 | Contant et al. | Oct. 30, 1951 |
| 2,577,703 | Fillinger | Dec. 4, 1951 |
| 2,590,365 | Anderson | Mar. 25, 1952 |
| 2,642,714 | Contant et al. | June 23, 1953 |
| 2,665,542 | Sheldon | Jan. 12, 1954 |

FOREIGN PATENTS

| Number | Country | Date |
|---|---|---|
| 195,382 | Switzerland | Apr. 16, 1938 |
| 483,195 | Germany | Sept. 27, 1929 |
| 673,634 | France | Oct. 8, 1929 |
| 801,819 | France | May 23, 1936 |